(12) United States Patent
Zhou et al.

(10) Patent No.: US 8,306,219 B2
(45) Date of Patent: Nov. 6, 2012

(54) METHOD AND SYSTEM FOR A CIPHERING INTERFACE WITH LIST PROCESSING

(75) Inventors: Yi Zhou, Carlsbad, CA (US); Li Fung Chang, Holmdel, NJ (US); Nelson Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 1195 days.

(21) Appl. No.: 11/353,687

(22) Filed: Feb. 14, 2006

(65) Prior Publication Data

US 2007/0189523 A1    Aug. 16, 2007

(51) Int. Cl.
*H04L 29/06* (2006.01)
(52) U.S. Cl. ............ 380/37; 341/58; 380/28; 380/44
(58) Field of Classification Search ............ 371/32; 341/58; 380/28, 44, 37; 709/236; 713/191
See application file for complete search history.

(56) References Cited

U.S. PATENT DOCUMENTS

| | | | |
|---|---|---|---|
| 4,377,862 A * | 3/1983 | Koford et al. ............ 714/748 |
| 5,666,411 A * | 9/1997 | McCarty ............ 705/51 |
| 6,054,942 A * | 4/2000 | Stemmler ............ 341/58 |
| 6,212,569 B1 * | 4/2001 | Cashman et al. ............ 709/236 |
| 2002/0006197 A1 * | 1/2002 | Carroll et al. ............ 380/44 |
| 2002/0118827 A1 * | 8/2002 | Luyster ............ 380/37 |
| 2003/0031316 A1 * | 2/2003 | Langston et al. ............ 380/28 |
| 2004/0250095 A1 * | 12/2004 | Feldman ............ 713/191 |
| 2004/0250101 A1 * | 12/2004 | Kanai ............ 713/193 |

* cited by examiner

*Primary Examiner* — Brandon Hoffman
*Assistant Examiner* — Michael D Anderson
(74) *Attorney, Agent, or Firm* — Sterne, Kessler, Goldstein & Fox P.L.L.C.

(57) ABSTRACT

A method and system for ciphering interface with list processing is described. Various aspects of a system for ciphering interface with list processing may include a cipher module that enables deciphering and/or bit stuffing, in hardware, of a potion of one of a plurality of data blocks starting at any bit location that is subsequent to a first bit of the one of the plurality of data blocks. One of the plurality of data blocks may comprise at least one data word. A modulus of a number representing the bit location with respect to a number of bits in the one of the data words may be a number greater than 0. The cipher module may enable selection of any bit location based on and index and/or an offset. The cipher module may enable selection of deciphering and/or bit stuffing based on configured information.

20 Claims, 34 Drawing Sheets

METHOD AND SYSTEM FOR A CIPHERING INTERFACE WITH LIST PROCESSING

CROSS-REFERENCE TO RELATED APPLICATIONS/INCORPORATION BY REFERENCE

This application makes reference to U. S. patent application Ser. No. 11/354,704 filed on even date herewith.

The above referenced application is hereby incorporated herein by reference in its entirety.

FIELD OF THE INVENTION

Certain embodiments of the invention relate to wireless communication. More specifically, certain embodiments of the invention relate to a method and system for a ciphering interface with list processing.

BACKGROUND OF THE INVENTION

Wideband code division multiple access (WCDMA) systems that support high speed downlink packet access (HSDPA) may utilize encryption when communicating information wirelessly between a mobile terminal and mobile network. HSDPA is supported by a protocol reference model (PRM) that comprises a plurality of protocol layers. Each layer in the protocol reference model may perform a subset of tasks that are required to enable a mobile terminal to communicate to the mobile network. The radio link control (RLC) layer may be utilized to perform a plurality of tasks related to data transfer and maintenance of the QoS as defined by higher layer. The RLC layers may support 3 types of service modes: transparent mode (TM), unacknowledged mode data (UMD), and acknowledged mode data (AMD) transfer.

The transparent mode (TM) service mode may enable transmission of data as a data block, which is transparent to the RLC layer. Consequently, a TM data block that is received at the RLC layer may be passed to an upper/lower layer protocol in the PRM without removing/adding any RLC header information from/to the received TM data. The RLC layer does not inspect or process any of the data contained in the TM data block.

In the unacknowledged mode data (UMD) service mode on the transmitter side, the RLC layer performs concatenation/segmentation of data blocks received from a higher layer protocol, and adds a sequence number that enables in-sequence delivery at a receiver. The data may also be encrypted. At the receiver, this process may be reversed in the RLC layer. The RLC sequence number enables the RLC layer at the receiver to detect if a transmitted RLC data block was not received. However, a receiving end (mobile terminal or network) that receives a UMD data block does not provide any indication to the transmitter that the UMD data block was not received by the intended recipient. The UMD data block may comprise a header portion that is utilized by the RLC layer, and a payload, or data, portion that may be utilized by an upper layer protocol.

In the acknowledged mode data (AMD) service mode, the RLC layer performs functions that may be equivalent to functions performed in the UMD service mode. In the AMD service mode, however, when an RLC data block is received, the receiver may send an acknowledgment (ACK) message to the transmitter. When the receiver detects that a transmitted RLC data block has not been received, a negative acknowledgment (NACK) message may be sent to the transmitter. The transmitter may respond to a received NACK message by retransmitting one or more previously transmitted RLC data blocks. In the AMD service mode, an RLC protocol entity in a receiver that receives an AMD data block may provide an indication to a corresponding RLC entity in a transmitter that the AMD data block was received by the intended recipient. This additional capability for the AMD service mode, may be referred to as a retransmission function. The AMD data block may comprise an RLC header portion that is utilized by the RLC layer, and a payload, or data, portion that may be utilized by an upper layer protocol.

When ciphering and/or deciphering TM data blocks, UMD data blocks, and/or AMD data blocks, the header portion is generally not encrypted or decrypted. The header portion may comprise an RLC header and/or a medium access control layer header (MAC). A MAC layer header, or MAC header, is as defined in 3GPP WCDMA/HSDPA standards. Consequently, a processor that encrypts a TM, UMD, and/or AMD data block may be required to locate the start of the data portion within the corresponding data block. However, among the various data blocks, the location of the start of the data portion may differ. The processor may be required to compute an offset to locate the start of the data portion for each data block processed. The data blocks may be stored in external memory. The external memory may comprise a plurality of addressable locations wherein each location may access a data word. The stored data blocks may be word-aligned such that the respective data blocks comprise an integer number of data words. The location of the start of the data portion in a data block, however, may not be coincident with a data word boundary.

In some conventional systems, the processor may utilize software and/or manipulate memory pointers to enable ciphering and/or deciphering operations to begin at the start of the data portion of the data block. This may result in slow processing times that may not be optimal for various high-speed operations, Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a ciphering interface with list processing substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a ciphering interface with list processing. The invention may comprise a method and system that ciphers, deciphers, bit shifts, and/or bit stuffs, in hardware, each of a plurality of data blocks. The plurality of data blocks may be individually ciphered and/or deciphered based on a list that identifies each of the data blocks. Various embodiments of the invention may comprise a method and system that enables the hardware to begin ciphering and/or deciphering of a data block at any bit location within the data block. The bit location may not be required to be coincident with a data word boundary. The hardware may determine whether to perform a ciphering, deciphering, and/or bit stuffing operation on each individual data block based on stored control information that may be retrieved based on configured information. Various embodiments of the invention may be utilized to perform F8, F9, and/or plain Kasumi operations in hardware, as defined in $3^{rd}$ Generation Partnership Project (3GPP) specifications, based on configured information.

In one embodiment of the invention, a method and system for a ciphering interface with list processing may comprise a wideband code division multiple access (WCDMA) cipher module. The WCDMA cipher module is described in U.S. patent application Ser. No. 11/354,704 filed Feb. 14, 2006, and is hereby incorporated herein by reference in its entirety.

Figure 1:
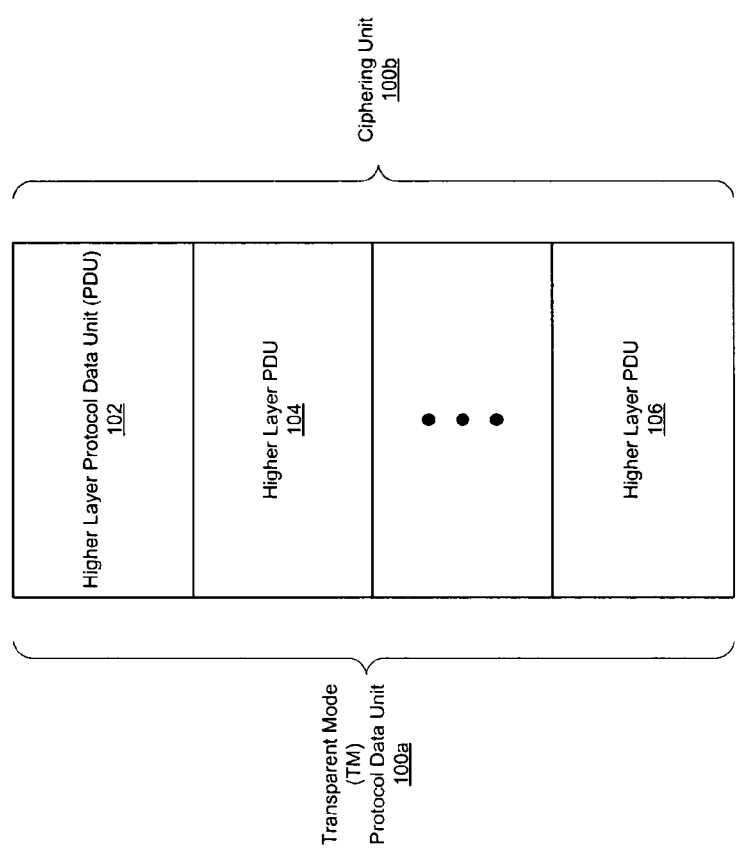
FIG. 1 is an illustration of an exemplary transparent mode (TM) protocol data unit (PDU) in connection with an embodiment of the invention.

FIG. 1 is an illustration of an exemplary transparent mode (TM) protocol data unit (PDU) in connection with an embodiment of the invention. Referring to FIG. 1, there is shown a transparent mode (TM) protocol data unit (PDU) 100a, a ciphering unit 100b. The TM PDU 100a may further comprise a plurality of higher layer PDUs 102, 104, and 106. The TM PDU 100a may be referred to as a data block. The size of the TM PDU 100a may not be multiple of 8 bits. TM PDU 100a is stored in memory as 32-bit words where the last work may be partially filled. For a TM PDU, the ciphering unit 100b is the entire TMPDU 100a.

Figure 2:
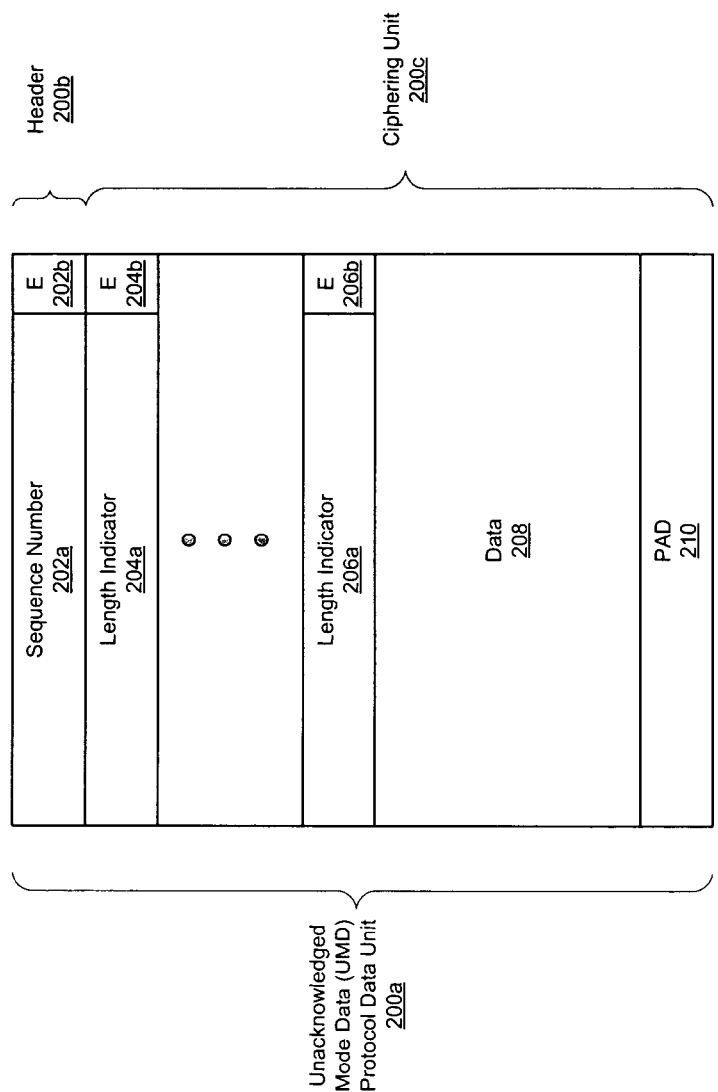
FIG. 2 is an illustration of an exemplary unacknowledged mode data (UMD) PDU in connection with an embodiment of the invention.

FIG. 2 is an illustration of an exemplary unacknowledged mode data (UMD) PDU in connection with an embodiment of the invention. Referring to FIG. 2, there is shown a UMD PDU 200a, a header field 200b, and a ciphering unit 200c. The UMD PDU 200a may further comprise a sequence number field 202a, an extension (E) field 202b, a plurality of length indicator fields 204a...206a and a corresponding plurality of E fields 204b...206b, a data field 208, and a pad field 210. The sequence number field 202a and E field 202b may comprise an octet of bits. The length field 204a and corresponding E field 204b may comprise an octet of bits. The length field 206a and corresponding E field 206b may comprise an octet of bits. The data field 208 may comprise a plurality of octets of bits. The pad field 210 may comprise one or more bits.

The header field 200b may comprise the sequence number field 202a and E field 202b. The ciphering unit 200c may comprise the plurality of length indicator fields 204a...206a and the corresponding plurality of E fields 204b...206b, the data field 208, and the pad field 210. The sequence number field 202a may identify a current UMD PDU 200a among a plurality including the current UMD PDU 200a and one or more preceding and/or subsequent UMD PDUs 200a. For example, the sequence number field 202a for the current UMD PDU 200a may comprise a binary representation of the number 7, where the sequence number field 202a for the immediately preceding UMD PDU 200a may comprise a binary representation of the number 6. Furthermore, the sequence number field 202a for the immediately subsequent UMD PDU 200a may comprise a binary representation of the number 8. Each UMD PDU 200a may be referred to as a data block. The E field 202b may comprise an indication of the type of information that follows the E field 202b in the UMD PDU 200a. For example, the E field 202b may indicate whether the field immediately following is a length indicator field 204a, or a data field 208. When the field immediately following the E field 202b is the data field 208, then the UMD PDU 200a may not comprise a length indicator field 204a...206a and corresponding E fields 204b...206b.

The length indicator field 204a...206a may indicate a number of octets contained in the UMD PDU 200a within fields subsequent to the E field 206b. These fields may comprise the data field 208 and/or the pad field 210. The length indictor field 204a may comprise a first portion of the length indictor field. The length indicator field 206b may comprise a subsequent portion of the length indicator field. The subsequent portion of the length indicator field may also be a last portion. The E field 204b may indicate whether a subsequent portion of the length indicator field, for example length indicator field 206a. When the E field 204b indicates that there is a subsequent portion of the length indicator field, the subsequent portion of the length indicator field may follow the E field 204b. When a subsequent portion of the length indicator field does not follow the E field 204b the data field 208 follows the E field 204b. The length indicator field 206a is substantially as described for the length indicator field 204a. The E field 206b is substantially as described for the E field 204b.

The data field 208 may comprise a plurality of bits received from a higher layer protocol. The pad field 210 may be optional. The padding byte may be added such that the UMD PDU 200a is of a pre-defined length.

The ciphering unit 200c may comprise a portion of the UMD PDU 200a that may be encrypted prior to be transmitted wirelessly in a UMD PDU. In the UMD PDU 200a the ciphering unit 200c may comprise the plurality of length indicator fields 204a...206a and corresponding E fields 204b...206b, the data field 208, and the pad field 210.

Figure 3:
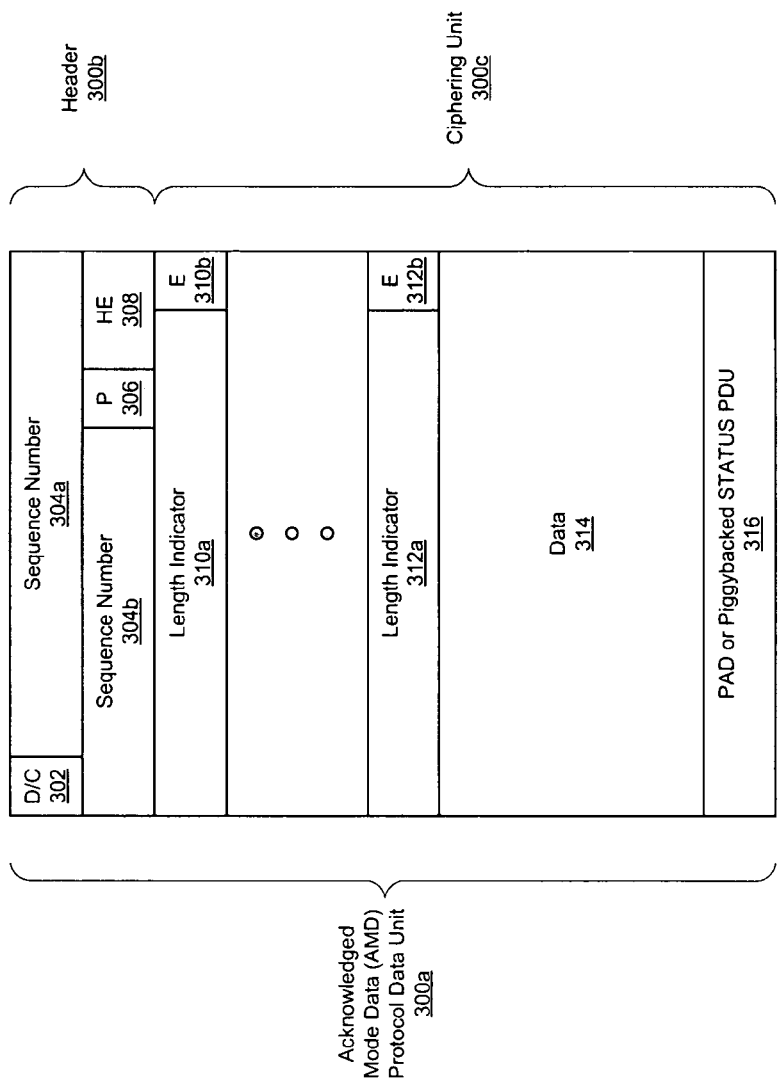
FIG. 3 is an illustration of an exemplary acknowledged mode data (AMD) PDU in connection with an embodiment of the invention.

FIG. 3 is an illustration of an exemplary acknowledged mode data (AMD) PDU in connection with an embodiment of the invention. Referring to FIG. 3, there is shown an AMD PDU 300a, a header field 300b, and a ciphering unit 300c. The AMD PDU 300a may further comprise a data or control (D/C) indication bit 302, a first portion of a sequence number field 304a, a subsequent portion of a sequence number field 304b, a polling bit (P) 306, a header extension (HE) field 308, a plurality of length indicator fields 310a...312a and a corresponding plurality of extension (E) fields 310b...312b, a data field 314, a piggybacked status PDU field or pad field 316. The D/C field 302 and sequence number field 304a may comprise an octet of bits. The sequence number field 304b, P field 306, and HE field 308 may comprise an octet of bits. The length field 310a and corresponding E field 310b may comprise an octet of bits. The length field 312a and corresponding E field 312b may comprise an octet of bits. The data field 314 may comprise a plurality of octets of bits. The piggybacked status PDU or pad field 316 may comprise an octet of bits. At a transmitter, an AMD PDU 300a may be referred to as a data block. At a receiver, a data block may comprise an AMD PDU 300a and a MAC header.

The header field 300b may comprise the D/C field 302, the sequence number fields 304a and 304b and the P field 306. The ciphering unit 300c may comprise the plurality of length indicator fields 310a...312a and the corresponding plurality of E fields 310b...312b, the data field 314, the piggybacked status PDU or pad field 316. The D/C field 302 may indicate whether the data field 314 contains control information or data. Control information may comprise information associated with a protocol in connection with the control plane of the PRM. Data may comprise information associated with a protocol in connection with the user plane of the PRM. The sequence number fields 304a and 304b may form a sequence number. The sequence number may be substantially as described for the sequence number field 202a. The P field 306 may comprise an indication of whether the AMD PDU 300a contains a piggybacked status PDU field 316. The HE field 308 may comprise an indication of the type of information that follows the HE field 308 in the AMD PDU 300a. The HE field 308 may be substantially as described for the E field 204b.

The length indicator field 310a...312a may indicate a number of octets contained in the AMD PDU 300a within fields subsequent to the E field 312b. These fields may comprise the data field 314, the piggybacked status PDU or pad field 316. The length indicator field 310a...312a may be substantially as described for the length indicator field 204a...206a. The E field 310b may be substantially as described for the E field 204b. The E field 312b may be substantially as described for the E field 206b. The data field 314 may comprise control information or data. The piggybacked status PDU 316 may comprise information that is to be transmitted in the AMD PDU 300a in response to a previously received PDU. If 316 is a pad field, it is inserted such that the AMD PDU 300a conforms to a pre-defined PDU length. If the preceding fields contained within the AMD PDU 300a comprise a sufficient number of octets to be of a pre-defined PDU length, the AMD PDU 300a may not utilize the pad field 316.

The ciphering unit 300c may comprise the plurality of length indicator fields 310a...312a and the corresponding plurality of E fields 310b...312b, the data field 314, the piggybacked status PDU or pad field 316. The ciphering unit 300c comprises an integer number of octets.

Data shown in 208 or 314 may comprise bits obtained from segmenting a large PDU received from higher layer. That is, the data unit in an AMD PDU or a UMD PDU may consist of segmented data blocks. Memory locations associated with each segmented data block may not be within 32-bit word aligned boundaries. Thus, a segmentation offset associated with each segmented data block may be computed by the CPU to indicate an offset corresponding to the start of data block from the first 32-bit word memory location pointer that references the data block. The segmentation offset may be used as an input offset in the ciphering process to enable efficient encipher operation without having software or extra hardware to perform data segmentation.

Figure 4A:
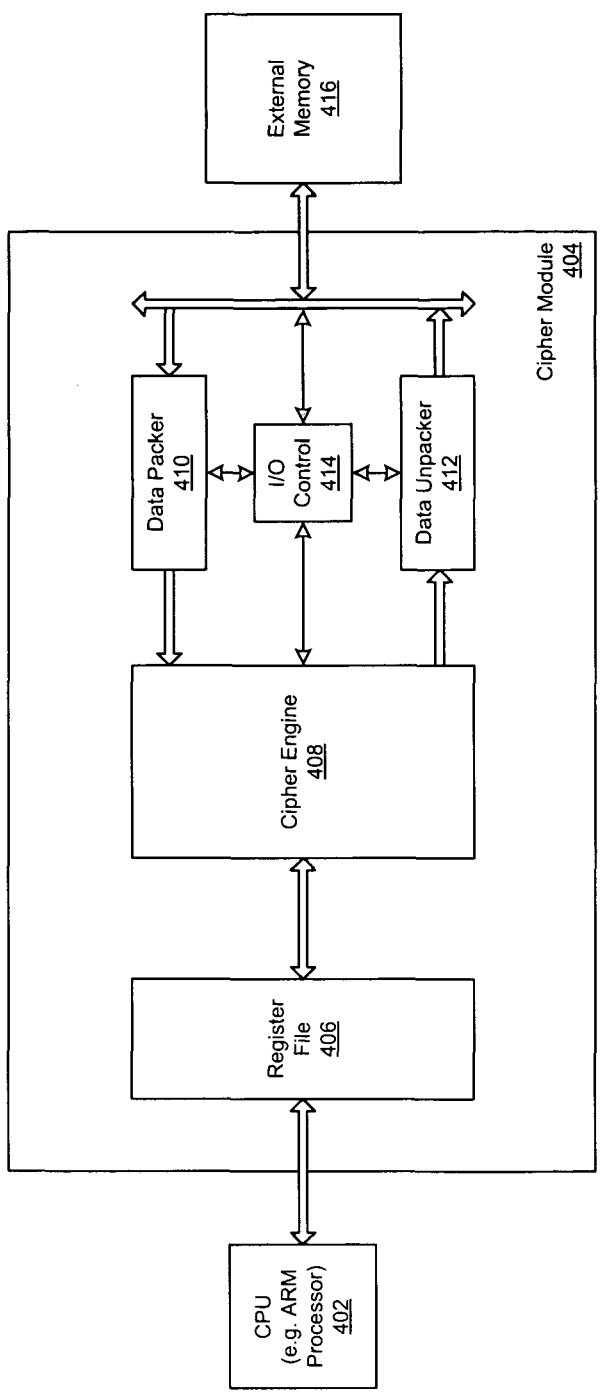
FIG. 4A is a block diagram of an exemplary system for a ciphering interface with list processing in accordance with an embodiment of the invention.

FIG. 4A is a block diagram of an exemplary system for a ciphering interface with list processing in accordance with an embodiment of the invention. Referring to FIG. 4A, there is shown a central processing unit (CPU) 402, a cipher module 404, and external memory 416. The cipher module 404 may further comprise a register file 406, a cipher engine 408, a data packer 410, a data unpacker 412, and an input and output (I/O) control block 414.

The CPU 402 may comprise suitable logic, circuitry, and/or code that may enable execution of software, processing of control information and data, control of system operations. The CPU 402 may generate control signals and/or configuration data that may enable peripheral hardware devices to perform system operations in hardware. The CPU 402 may also receive control signals and/or data from peripheral hardware devices. Based on the received control signals and/or data, the CPU 402 may execute software, process the received data, and/or generate subsequent control signals.

In an embodiment of the invention, the CPU 402 may be implemented in an integrated circuit (IC) device. In another embodiment of the invention, the CPU 402 may be implemented as a processor core that is a component within an IC device, for example, as in a system on a chip (SOC) device. An SOC device may comprise the CPU 402 and the cipher module 404, for example.

The cipher module 404 may individually decipher or not decipher at least a portion of each of a received plurality of data blocks based on configuration information. Each data block may comprise one or more data words. In a deciphering operation, a data block may comprise a transparent mode (TM) protocol data unit (PDU) and a MAC header, an unacknowledged mode data (UMD) PDU and a MAC header, or an acknowledged mode data (AMD) PDU and a MAC header, for example. In a ciphering operation, a data block may comprise a TM PDU, AMD PDU or UMD PDU. Based on the configuration information, at least a portion of an individual data block may be deciphered. The individual data block may comprise data that is encrypted. The portion of the individual data block that comprises encrypted data may be deciphered.

The cipher module 404 may determine that the individual data block comprises data that is encrypted based on the configuration information. The portion of the individual data block that may be deciphered may be referred to as a cipher unit. Decipher may refer to a process by which encrypted data is decrypted. Encrypted data may be referred to as cipher text. The beginning of the cipher unit portion in a data block may be determined based on an offset. The offset, which may be utilized to locate the beginning of a cipher unit to be deciphered in the cipher module, may be referred to as an input offset. The input offset may indicate any bit location within a data word that comprises a plurality of bits. The number of bits contained in a cipher unit may not be an integer multiple of the number of bits contained in a data word. Consequently, the number of bits contained in the cipher unit may be characterized according to the following equation, for example:

$$NB_{CU} \% NB_{DW} > 0 \qquad \text{Equation[1]}$$

where $NB_{CU}$ may represent the number of bits contained in a cipher unit, $NB_{DW}$ may represent the number of bits contained in a data word, and % may represent the modulus operator.

Prior to deciphering the cipher unit, the cipher module 404 may locate the beginning of the cipher unit within the individual data block by removing bits from the individual data block at bit locations that precede the bit location indicated by the input offset. This may be referred to as bit shifting operation. The removed bits may be referred to as unstuffed bits. The cipher unit may be deciphered by utilizing a cipher key that may be computed based on the configuration information. The deciphered cipher unit may comprise decrypted data. The decrypted data may be referred to as clear text data. The deciphered cipher unit may be referred to as a clear text data unit.

The individual data block may comprise data that is unencrypted. The individual data block may comprise a clear text unit. At least a portion of the individual data block that comprises unencrypted data may be aligned based on an upper layer protocol (ULP). The cipher module 404 may determine that the individual data block comprises data that is unencrypted based on the configuration information. The cipher module 404 may determine the beginning of the clear text unit within the individual data block based on an offset, for example, an input offset.

The cipher module 404 may individually cipher or not cipher at least a portion of each of a plurality of data blocks to be transmitted wirelessly based on configuration information. The portion of each data bock to be transmitted may comprise a clear text unit. Each clear text unit to be transmitted may comprise one or more data words. The cipher module 404 may determine that an individual data block comprises a clear text unit that is to be ciphered based on the configuration information. The cipher module 404 may cipher a clear text unit to form a cipher unit. The data block may be a TM PDU, a UMD PDU, or an AMD PDU.

Prior to ciphering the clear text unit, the cipher module 404 may locate the beginning of the clear text unit within the individual data block by performing bit-shifting operation on the individual data block to remove bits at bit locations that precede any bit location indicated by an offset, for example, an input offset. The clear text unit may be ciphered by utilizing a cipher key that may be computed based on the configuration information. Subsequent to ciphering the clear text unit, the cipher module 404 may perform a stuff bits operation on the cipher unit. The number of stuff bits may be determined based on an offset, for example, an output offset. The stuff bits may represent a determined value. For example, each stuff bit may represent a value of 0.

The cipher module 404 may determine that the individual data block may not be ciphered based on the configuration information. The cipher module 404 may determine the beginning of the clear text unit within the individual data block based on an offset, for example, an input offset. The cipher module may append stuff bits at the beginning of the clear text unit. The stuff bits may represent a determined value. For example, each stuff bit may represent a value of 0. The stuff bits and the clear text unit may form a combined data unit that may be referred to as a word-aligned data unit. The number of stuff bits may be determined based on an offset, for example, an output offset. The clear text unit may be a TM PDU, a UMD PDU, or an AMD PDU.

The register file 406 may comprise suitable logic, circuitry, and/or code that may enable storing and/or retrieving of control interface information, configuration data, and/or other information that may be utilized during operation of the cipher module 404. The register file 406 may store received information based on received control signals.

The cipher engine 408 may comprise suitable logic, circuitry, and/or code that may enable ciphering and/or deciphering of at least a portion of one or more data blocks. The cipher engine 408 may utilize a cipher key when performing ciphering and/or deciphering operations. The cipher engine 408 may retrieve data, configuration information, and/or other information from the register file 406 when performing ciphering and/or deciphering operations. The cipher engine 408 may receive data blocks, and/or cipher units from the data packer 410. The cipher engine 408 may send cipher units and/or clear text units to the data unpacker 412. The cipher engine 408 may receive and/or send control signals from and/or to the I/O control block 414.

The data packer 410 may comprise suitable logic, circuitry, and/or code that may enable bit shifting operations. The data packer 410 may receive one or more data words as input. The data packer 410 may perform bit shifting operations to remove bits contained in a first data word and packing bits from a subsequent data word based on control information. The data may be stored in, for example, an internal bit shifting register within the data packer 410. The data packer 410 may perform bit shifting operations that align the data relative to a 32-bit word, for example. The bit shifting operation performed on the first data word may result in removal of a portion of the bits contained in the first data word and this may be referred to as bit unstuffing. In a bit packing operation, a portion of the bits contained in the subsequent data word may be combined with the residual portion of the first data word to form a packed data word. For example, given a data word that comprises 32 bits, if a bit shifting operation removes 8 bits from the first data word, 8 bits from the subsequent data word may be combined with the residual 24 bits from the first data word to form a packed data word that comprises 32 bits.

The data unpacker 412 may comprise suitable logic, circuitry, and/or code that may enable bit stuffing operations. The data unpacker 412 may receive one or more data words as input. The data unpacker 412 may subsequently bit-shifting the data word from the cipher engine 408 and place the shifted data word in the output buffer 420. The I/O control monitors buffer status of the output buffer, if it is full, I/O control informs the bus control unit to offload the data in the output buffer to the external memory 416 using burst mode access. The data unpacker 412 may perform bit unstuffing operations based on received control signals from the I/O control block 414.

The data unpacker 412 may comprise suitable logic, circuitry, and/or code that may enable bit stuffing operations. The data unpacker 412 may receive one or more data words as input. The data unpacker 412 may perform bit shifting operations to create an allocation of additional bits in a first data word, followed by an insertion of stuff bits, based on control information. The number of stuff bits may equal the number of additional bits resulting from the bit shifting operation. A portion of the bits from the first data word may be moved to a subsequent data word. The number of bits moved may be equal to the number of stuff bits. The insertion of stuff bits resulting from a bit shifting operation may be referred to as bit stuffing. For example, given a data word that comprises 32 bits, if a bit shifting operation inserts 8 bits into the first data word, 8 stuff bits may be inserted into the first data word. Consequently, 8 bits from the first data word may be moved such that they may be located in a subsequent data word.

The I/O control block 414 may comprise suitable logic, circuitry, and/or code that may enable input and/or output of data blocks, and/or data blocks to and/or from the cipher module 404. The I/O control block 414 may also enable control of bit shifting and/or bit unstuffing operations. The I/O control block 414 may perform I/O operations based on received control signals from the cipher engine 408. The I/O control block 414 may also send control signals to the cipher engine 408.

The external memory 416 may comprise suitable logic, circuitry, and/or code that may enable storing and/or retrieving of data, executable software code, configuration data, and/or other information that may be utilized during system operations. The external memory 416 may store received information to a location based on a received index and on received control signals. The index may comprise an address that refers to a location within the external memory 416. The index may reference a location that is associated with a plurality of bits grouped to form a data word. A data word may also be referred to as a word. The received index that may be utilized by the external memory 416 to store the received information may be referred to as an output data pointer, for example. The external memory 416 may store information comprising a data word to the location indicated by the index. In various embodiments of the invention a data word may comprise 32 bits, for example.

In operation, the CPU 402 may store configuration information in the register file 406. The cipher module 404 may utilize the configuration information to retrieve one or more cipher keys from external memory 416. The cipher module 404 may also utilize the configuration information to retrieve information from external memory 416 that may be utilized to control operation of the cipher engine 408. For example, the retrieved information may be utilized to determine a number of bits in the data block to be processed by the cipher module 404. The cipher module 404 may subsequently perform ciphering, deciphering, bit shifting, and/or bit unstuffing operations on each of the data blocks in hardware. The retrieved information may also indicate a location within external memory 416 from which an individual data block may be retrieved. The retrieved information may be utilized to determine an input data pointer and/or output data pointer, an input offset and/or output offset, whether the individual data block is to be ciphered, deciphered, and/or bit stuffed, and where the output data unit may be stored within external memory 416, for example. An input offset and/or output offset utilized by the cipher module 404, which may indicate a total number of bits in a MAC header and/or RLC header (input offset for de-ciphering operation, output offset for ciphering operation) or segmentation offsets (input offset for ciphering operation) may be calculated by the CPU 402. In an exemplary embodiment of the invention, the cipher module 404 may utilize an input data pointer to determine a location within the external memory 416 from which to retrieve a data block. In this regard, the cipher module 404 may utilize an output data pointer to determine a location within the external memory 416 at which to store a data unit and/or cipher unit.

The cipher module 404 may fetch data from the external memory 416. The data may be stored in an internal bit shifting register within the data packer 410. The data packer 410 may perform bit shifting operations that align the data relative to a 32-bit word. The data packer 410 may store the word-aligned data in an internal input buffer. The data packer 410 may perform bit-shifting and word packing operations based on received control signals from the I/O control block 414. While the data packer 410 continues fetching subsequent data from external memory 416, and writing subsequent word-aligned data to the internal input buffer within the data packer 410, the I/O control unit 414 may receive status information from the internal input buffer. Based on the received status information from the internal input buffer, the I/O control unit 414 may instruct the cipher engine 408 to retrieve data from the internal input buffer within the data packer 410. The retrieved data may be ciphered or deciphered.

Subsequent to deciphering a cipher unit, the cipher module 404 may write the deciphered data to an internal output buffer within the data unpacker 412. The I/O control unit 414 may receive status information from the internal output buffer within the data unpacker 412. Based on the received status information, the I/O control unit 414 may instruct the internal output buffer within the data unpacker 412 to store word-aligned data in the external memory 416.

Subsequent to ciphering a clear text data unit, the cipher module 404 may write the ciphered data to an internal bit shifting register within the data unpacker 412. The data unpacker 412 may perform bit shifting and bit stuffing operations on the ciphered data that allocate bits that may be utilized to contain header information. The data unpacker may store the bit shifted and bit stuffed ciphered data in an internal output buffer. The I/O control unit 414 may receive status information from the internal output buffer within the data unpacker 412. Based on the received status information, the I/O control unit 414 may instruct the internal output buffer within the data unpacker 412 to store word-aligned data in the external memory 416.

The data packer 410, cipher engine 408 and data unpacker 412 may perform respective functions independently in a pipelined operation. For example, while the data unpacker 412 stores current data to the external memory 416, the cipher engine 408 may cipher or decipher subsequent data. The ciphered or deciphered subsequent data may subsequently be communicated to the data unpacker 412. While the cipher engine 408 ciphers or deciphers current data, the data packer 410 may retrieve subsequent data from external memory 416. The retrieved subsequent data may be communicated to the cipher engine 408.

Figure 4B:
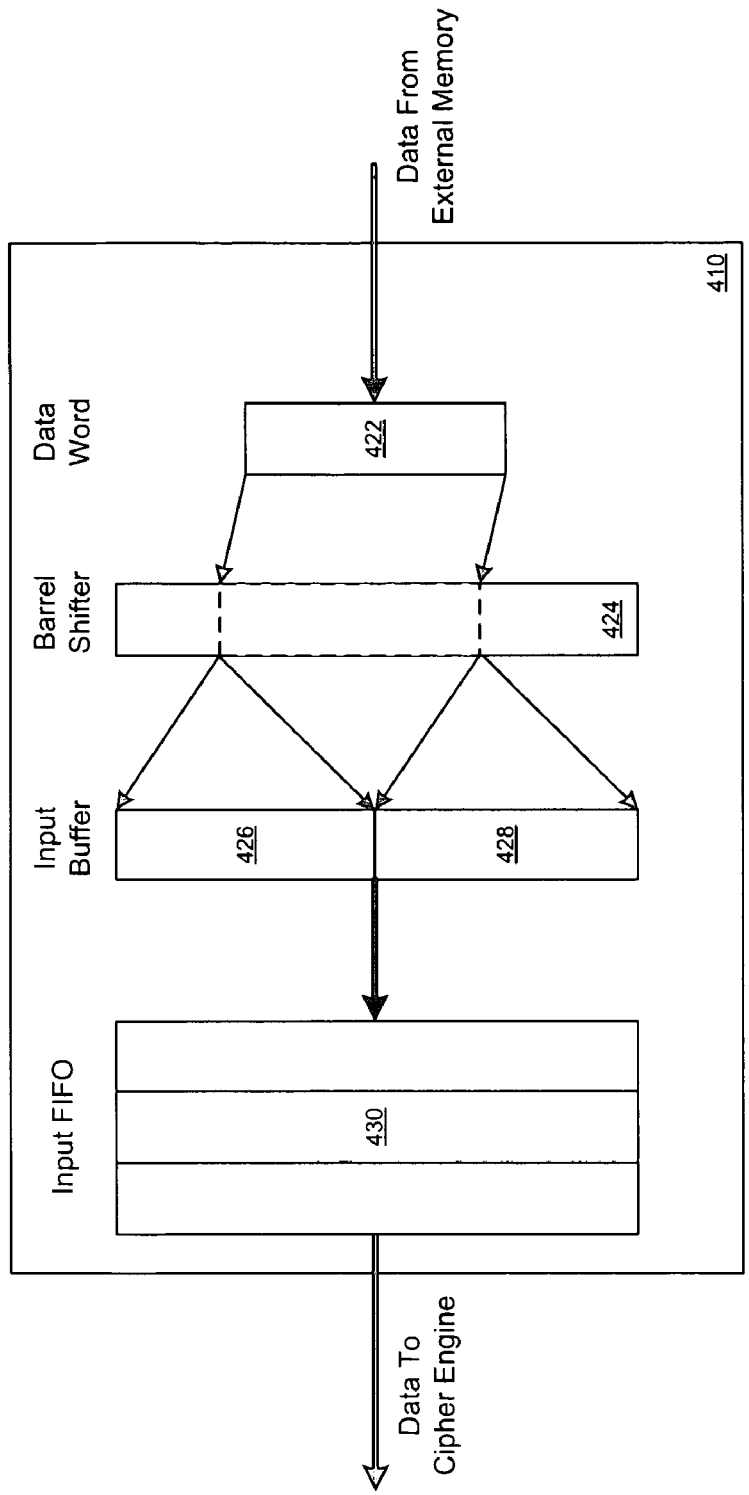
FIG. 4B is a block diagram of an exemplary data packer in accordance with an embodiment of the invention.

FIG. 4B is a block diagram of an exemplary data packer in accordance with an embodiment of the invention. Referring to FIG. 4B, there is shown a data packer 410. The data packer 410 may comprise a received data word 422, a barrel shifter 424, and upper input buffer 426, a lower input buffer 428, and an input first in first out (FIFO) buffer 430. The received data word 422 may represent data received by the data packer 410 from external memory 416, for example. In various embodiments of the invention, the received data word 422 may comprise 32 bits.

The barrel shifter 424 may comprise suitable logic, circuitry, and/or code that may enable bit unstuffing operations based on an input data offset, for example. The barrel shifter may receive a first data word 422. The received first data word 422 may be shifted by zero or more bit positions within the barrel shifter 424 based on a value associated with the input data offset. As a result of the bit shifting operation, a number of bits may be removed from received first data word 422 corresponding to the number of bit positions that the first data word 422 was shifted within the barrel shifter 424. The process of removing one or more bits from a received data word may be referred to as a bit unstuffing operation. The residual data word resulting from the data shift operation may comprise fewer bits than did the received first data word 422. The residual data word may be stored within the barrel shifter 424. In various embodiments of the invention, the barrel shifter 424 may comprise 64 bits.

A subsequent data word 422 may be received and stored within the barrel shifter 424. The barrel shifter 424 may perform a bit packing operation by utilizing the stored residual data word, and a portion of bits from the subsequent received data word 422. The number of bits in the portion from the subsequent received data word 422 may be equal to the number of bit positions by which the first received data word 422 was bit shifted. The combined residual data word, and portion of bits from the subsequent received data word 422 may form a packed data word. In various embodiments of the invention, the packed data word may comprise 32 bits. The bit packing operation may be repeated within the barrel shifter 424 as additional data words 422 are received.

The upper input buffer 426 may comprise suitable logic, circuitry, and/or code that may enable storing of data words. The upper input data buffer 426 may be utilized to store a data word. In various embodiments of the invention, the upper input buffer 426 may comprise 32 bits. The lower input buffer 428 may be substantially as described for the upper data buffer 426.

The input FIFO buffer 430 may comprise suitable logic, circuitry, and/or code that may enable simultaneous storage of a plurality of long data words. A long data word may comprise a number of bits equal to a total number of bits contained in a plurality of data words. When the input FIFO buffer 430 has reached a maximum number of long data words that may be simultaneously stored at a given time instant, the input FIFO buffer 430 may be referred to as being full. When the input FIFO buffer 430 is full, a status information signal may be generated by the I/O control 414 to trigger the cipher engine to unload data from the FIFO. The input FIFO buffer 430 may also generate a status information signal when one or more long data words is stored. The long data word that is output to the cipher engine 408 may be the long data word that has been stored within the input FIFO buffer 430 for a longest time interval in comparison to other long data words among the plurality of long data words currently stored in the input FIFO buffer 430. In various embodiments of the invention, a long data word may comprise 64 bits.

In operation, the barrel shifter 424 may receive a data word 422 from the external memory 416. When the barrel shifter 424 generates a packed data word, the packed data word may be stored in the upper input buffer 426 or in the lower input buffer 428. When the upper input buffer 426 and lower input buffer 428 each contain a stored data word, a combined long data word, formed by the data words contained in the upper input buffer 426 and in the lower input buffer 428 respectively, may be stored in the input FIFO buffer 430. The input FIFO 430 may output a stored long data word to the cipher engine 408. The input FIFO 430 may send status information signals to the I/O control block 414. The input FIFO 430 may receive control signals from the I/O control block 414.

After the barrel shifter 424 receives a last data word 422 from the external memory 416, a portion of the bits from the last data word 422 may be combined with pad bits. Individual pad bits may comprise a determined value, for example a binary value equal to 0.

Figure 4C:
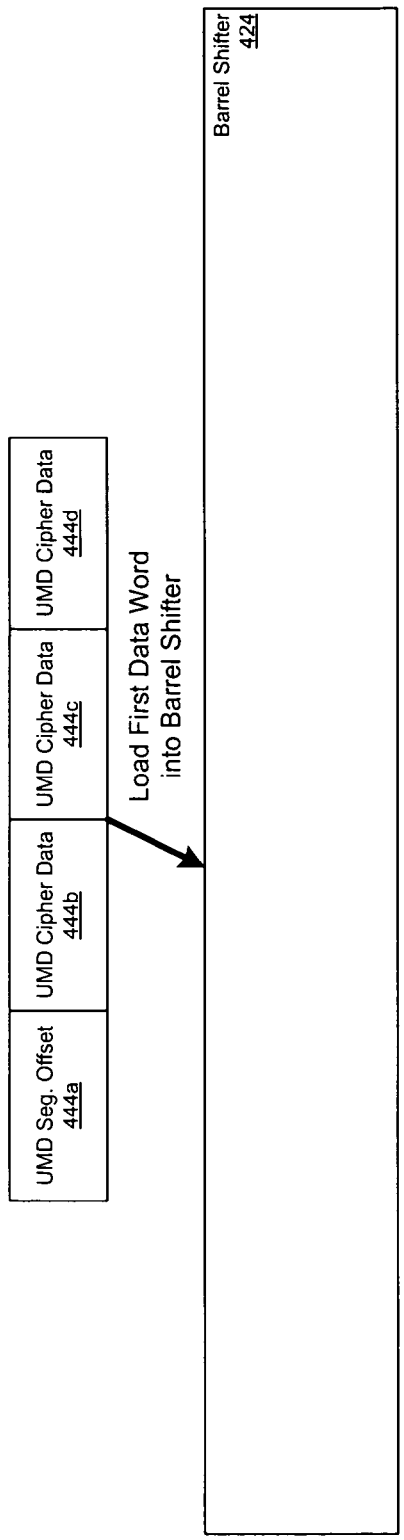
FIG. 4C is an exemplary illustration of a first data word load operation into a barrel shifter in a data packer in accordance with an embodiment of the invention.

FIG. 4C is an exemplary illustration of a first data word load operation into a barrel shifter in a data packer in accordance with an embodiment of the invention. Referring to FIG. 4C, there is shown a barrel shifter 424, a UMD payload segmentation offset 444a, and a plurality of UMD cipher data units 444b, 444c, and 444d. The UMD header 444a, and plurality of UMD data units 444b, 444c, and 444d may comprise a first data word in a UMD data block. The first data word may be retrieved from the external memory 416, and loaded into the barrel shifter 424.

Figure 4D:
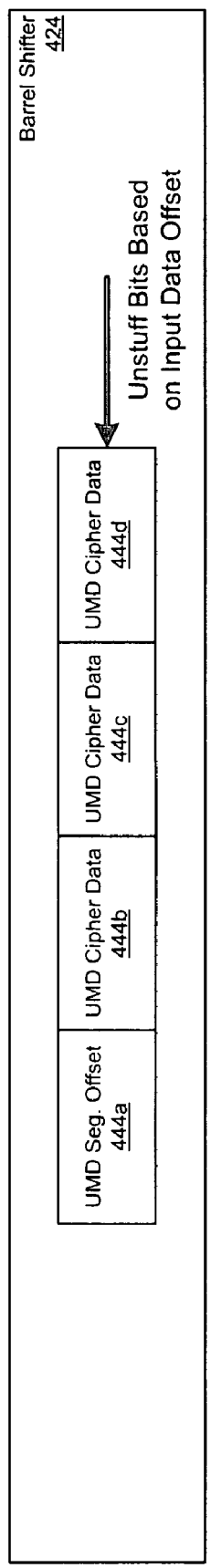
FIG. 4D is an exemplary illustration of a bit shifting operation on a data word in a data packer in accordance with an embodiment of the invention.

FIG. 4D is an exemplary illustration of a bit shifting operation on a data word in a data packer in accordance with an embodiment of the invention. Referring to FIG. 4D, there is shown a barrel shifter 424, a UMD segmentation offset 444a, and a plurality of UMD cipher data units 444b, 444c, and

444*d*. The barrel shifter 424 may perform a bit shifting operation on the loaded data word based on an input data offset. The input data offset may determine a number of bit positions in connection with the bit shifting operation.

Figure 4E:
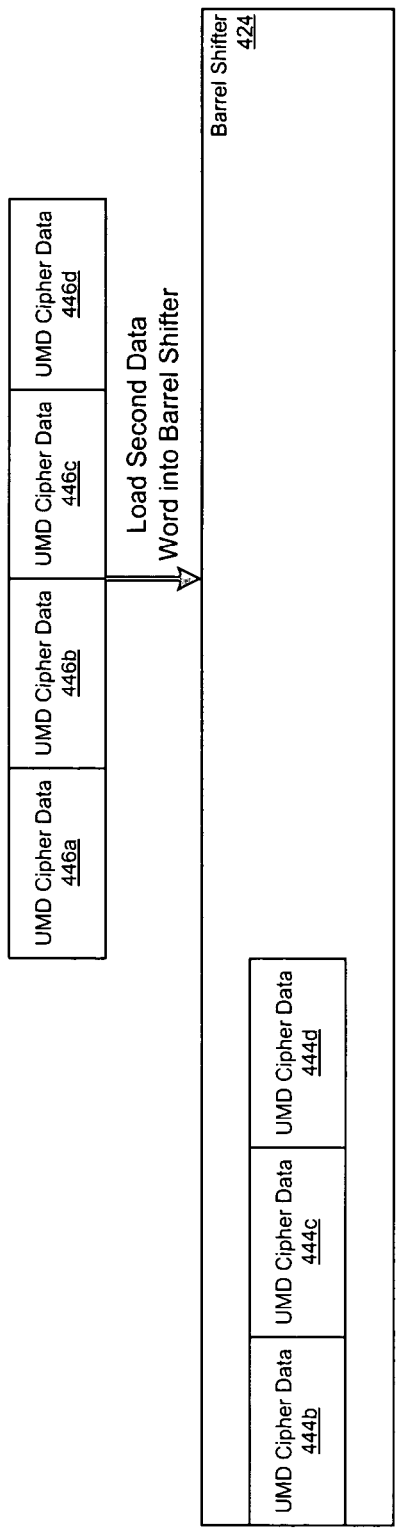
FIG. 4E is an exemplary illustration of a bit unstuffing operation on a data word in a data packer in accordance with an embodiment of the invention.

FIG. 4E is an exemplary illustration of a bit unstuffing operation on a data word in a data packer in accordance with an embodiment of the invention. Referring to FIG. 4E, there is shown a barrel shifter 424, a plurality of UMD cipher data units 444*b*, 444*c*, and 444*d*, and a plurality of UMD cipher data units 446*a*, 446*b*, 446*c*, and 446*d*. The plurality of UMD data units 446*a*, 446*b*, 446*c*, and 446*d* may comprise a second data word in a UMD data block. The second data word may be retrieved from the external memory 416, and loaded into the barrel shifter 424.

A bit unstuffing operation was performed on the first data word and a residual portion of the first data word shown in FIG. 4E. The residual portion may comprise the plurality of UMD cipher data units 444*b*, 444*c*, and 444*d*. Bits associated with the corresponding UMD segmentation offset 444*a* are shown to have been removed as a result of the bit unstuffing operation. The corresponding input data offset, which was utilized during the bit unstuffing operation within the barrel shifter 424, may correspond to the number of bits contained in the bit unstuffed UMD segmentation offset 444*a*.

Figure 4F:
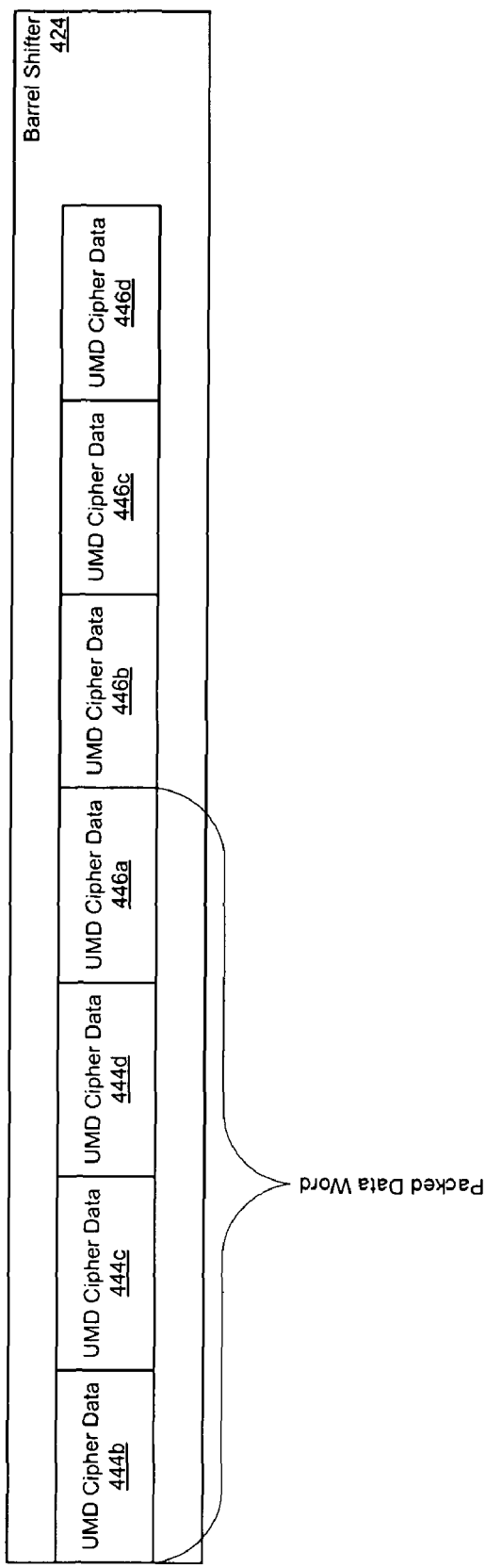
FIG. 4F is an exemplary illustration of a loaded barrel shifter in a data packer in accordance with an embodiment of the invention.

FIG. 4F is an exemplary illustration of a loaded barrel shifter in a data packer in accordance with an embodiment of the invention. Referring to FIG. 4F, there is shown a barrel shifter 424, a plurality of UMD cipher data units 444*b*, 444*c*, and 444*d*, and a plurality of UMD cipher data units 446*a*, 446*b*, 446*c*, and 446*d*. A portion of the bits from the first data word, comprising UMD cipher data units 444*b*, 444*c*, and 444*d*, and a portion of bits from the second data word, comprising the UMD cipher data unit 446*a* may be combined in a bit packing operation to form a packed data unit.

Figure 4G:
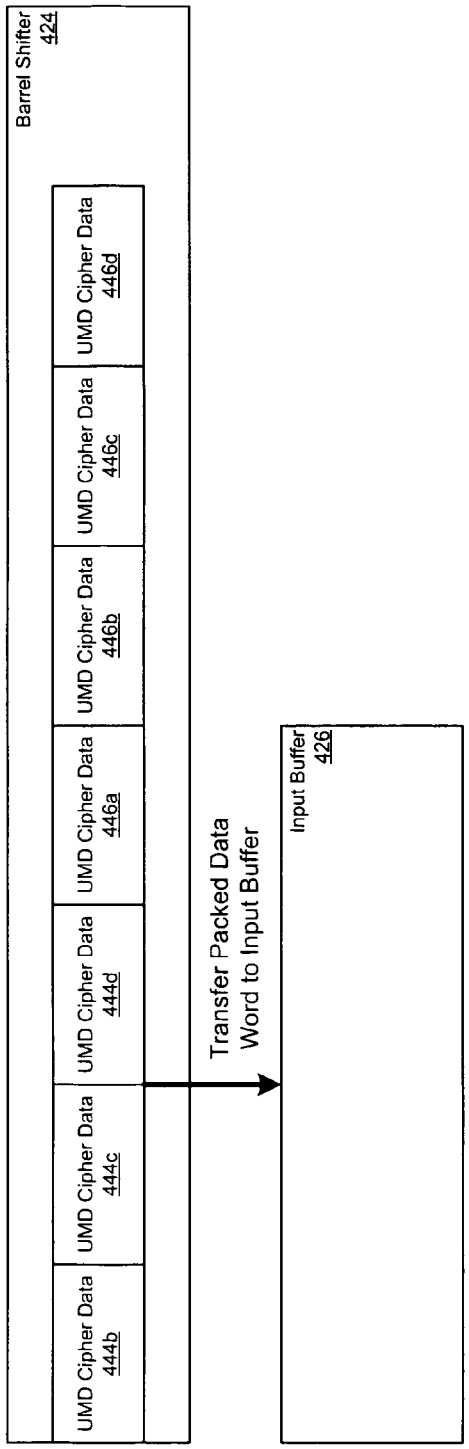
FIG. 4G is an exemplary illustration of a packed data unit load into an input buffer in a data packer in accordance with an embodiment of the invention.

FIG. 4G is an exemplary illustration of a packed data unit load into an input buffer in a data packer in accordance with an embodiment of the invention. Referring to FIG. 4G, there is shown a barrel shifter 424, an upper input buffer 426, a plurality of UMD cipher data units 444*b*, 444*c*, and 444*d*, and a plurality of UMD cipher data units 446*a*, 446*b*, 446*c*, and 446*d*. The packed data word, comprising the UMD cipher data units 444*b*, 444*c*, 444*d*, and 446*a* may be transferred from the barrel shifter 424 to the upper input buffer 426. The residual portion of the second data word, comprising UMD cipher data units 446*b*, 446*c*, and 446*d* may continue to be stored in the barrel shifter 424 subsequent to the transfer of the packed data unit.

Figure 4H:
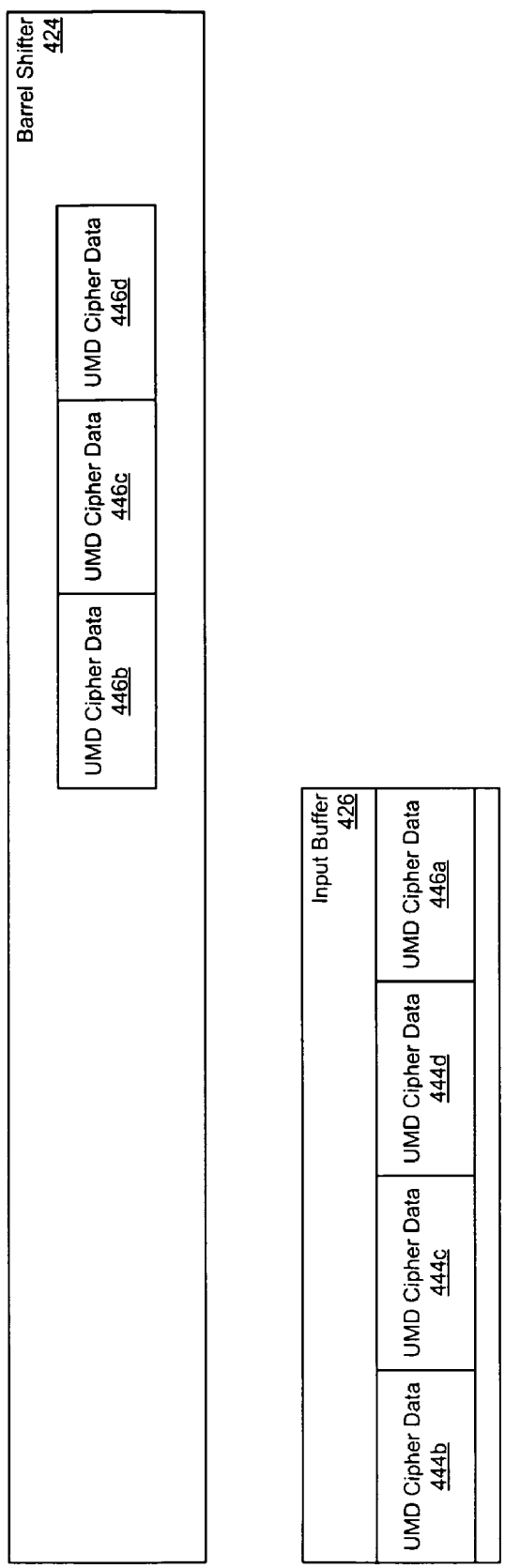
FIG. 4H is an exemplary illustration of a loaded input buffer and barrel shifter in a data packer in accordance with an embodiment of the invention.

FIG. 4H is an exemplary illustration of a loaded input buffer and barrel shifter in a data packer in accordance with an embodiment of the invention. Referring to FIG. 4H, there is shown a barrel shifter 424, an upper input buffer 426, a plurality of UMD cipher data units 444*b*, 444*c*, and 444*d*, and a plurality of UMD cipher data units 446*a*, 446*b*, 446*c*, and 446*d*. The packed data word, comprising UMD cipher data units 444*b*, 444*c*, 444*d*, and 446*a* were transferred from the barrel shifter 424 to the upper input buffer 426. The residual portion of the second data word, comprising UMD cipher data units 446*b*, 446*c*, and 446*d* may continue to be stored in the barrel shifter 424. If a subsequent data word is loaded into the barrel shifter 424, the bits associated with the residual portion of the second data word may be combined with a portion of bits in the subsequent data word, in a bit packing operation, to form a second packed data unit. If the second data word is the last data word, the barrel shifter 424 may perform a bit packing operation by appending pad bits to the residual portion of the second data word, in a bit packing operation, to form a last packed data unit. The last packed data unit may be subsequently transferred to the lower input buffer 428.

Figure 4I:
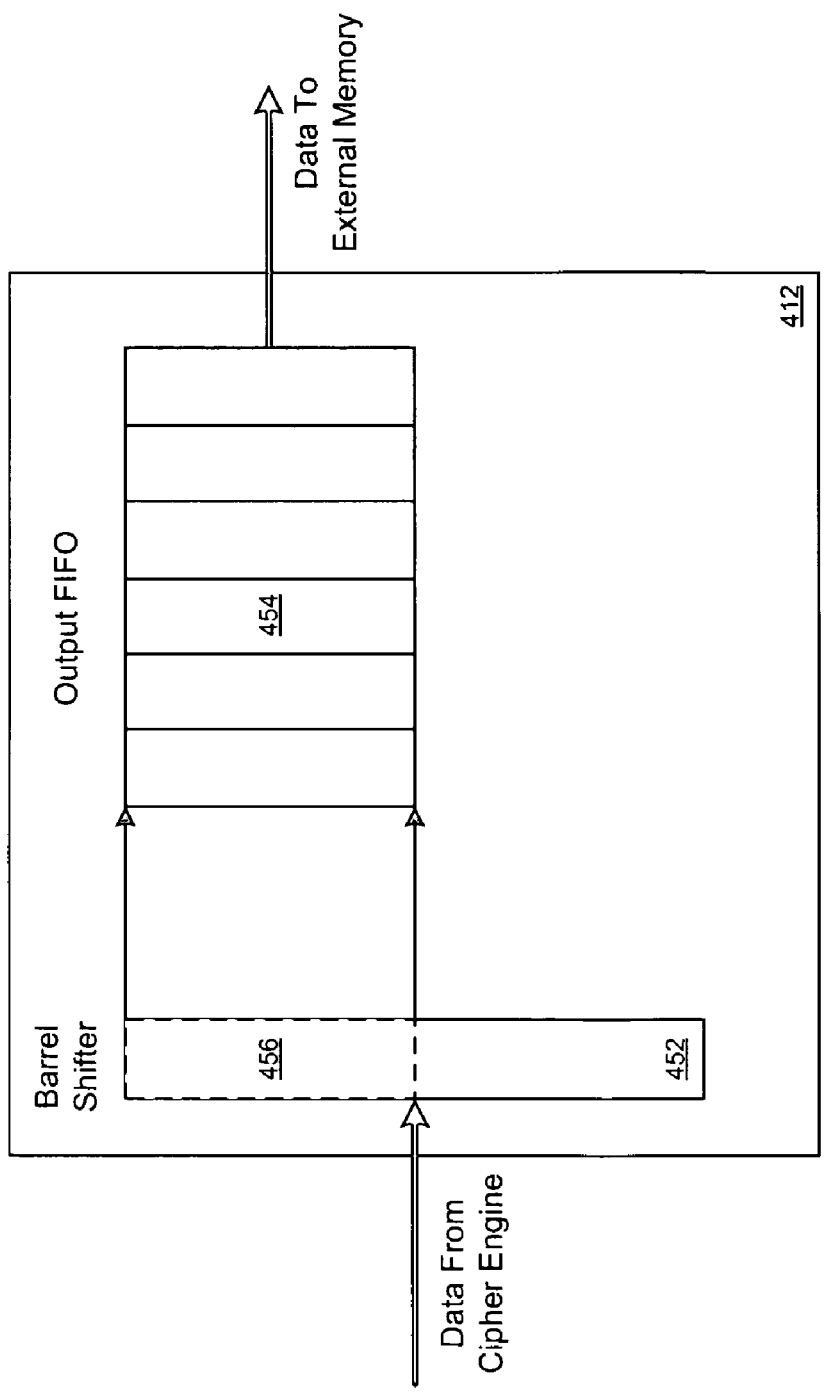
FIG. 4I is a block diagram of an exemplary data unpacker in accordance with an embodiment of the invention.

FIG. 4I is a block diagram of an exemplary data unpacker in accordance with an embodiment of the invention. Referring to FIG. 4B, there is shown a data unpacker 412. The data unpacker 412 may comprise a received data word 456, a barrel shifter 452, and an output FIFO buffer 454. The received data word 456 may represent data received by the data unpacker 412 from the cipher engine 408. In various embodiments of the invention, the received data word 456 may comprise 32 bits.

The barrel shifter 452 may comprise suitable logic, circuitry, and/or code that may enable bit stuffing operations based on an output data offset, for example. The barrel shifter may receive a first data word 456. The received first data word 456 may be shifted by zero or more bit positions within the barrel shifter 456 based on a value associated with the output data offset. As a result of the bit shifting operation, a number of bits may be inserted into the received first data word 456 corresponding to the number of bit positions that the first data word 456 was shifted within the barrel shifter 452. The inserted bits may be referred to as stuff bits. The process of bit shifting a received data word and inserting stuff bits into the bit shifted received data word may be referred to as a bit stuffing operation. Individual stuff bits may comprise a determined value, for example a binary value equal to 0. The bit stuffed residual data word may be stored within the barrel shifter 452. In various embodiments of the invention, the barrel shifter 452 may comprise 64 bits. The bit stuffed residual data word may be subsequently transferred to the output FIFO buffer 454.

The output FIFO buffer 454 may comprise suitable logic, circuitry, and/or code that may enable simultaneous storage of a plurality of data words. When the output FIFO buffer 454 has reached a maximum number of data words that may be simultaneously stored at a given time instant, the output FIFO buffer 454 may be referred to as being full. When the output FIFO buffer 454 is full, a status information signal may be generated. The output FIFO buffer 454 may also generate a status information signal when one or more data words has been stored. The output FIFO buffer 454 may output a data word in response to a received control signal. The data word that is output may be the data word that has been stored within the output FIFO buffer 454 for a longest time interval in comparison to other long data words among the plurality of long data words currently stored in the output FIFO buffer 454.

In operation, the barrel shifter 452 may receive a data word 456 from the cipher engine 408. The barrel shifter 452 may subsequently generate a bit stuffed data word based on the received data word 456. The barrel shifter 452 may store the bit stuffed data word in a location within the output FIFO buffer 454. The output FIFO buffer 454 may subsequently output a stored data word to the external memory 416. The output FIFO 454 may send status information signals to the I/O control block 414. The input FIFO 454 may receive control signals from the I/O control block 414.

Figure 4J:
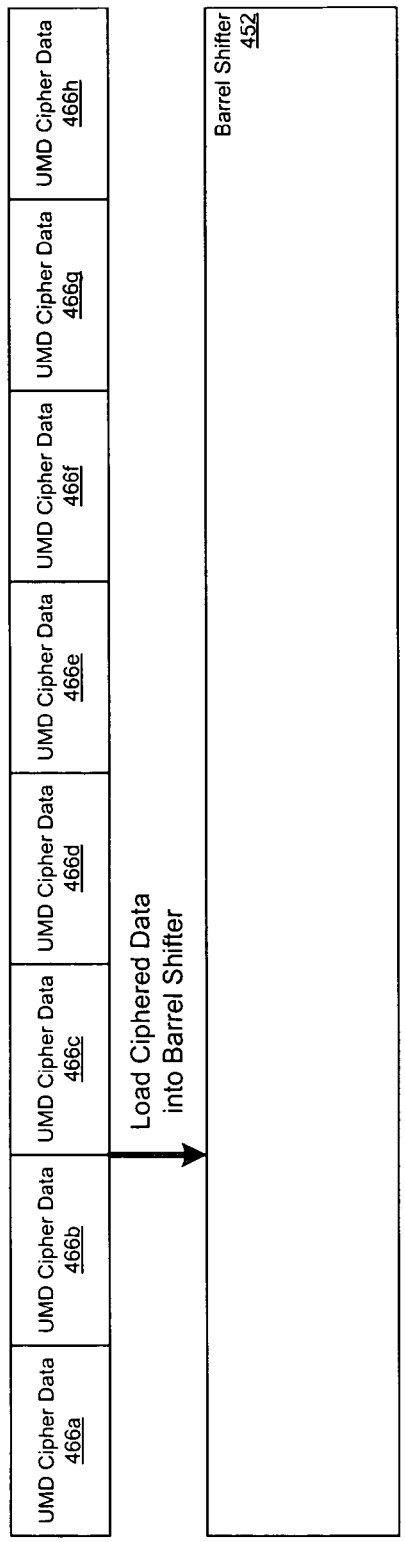
FIG. 4J is an exemplary illustration of a first data word load operation into a barrel shifter in a data unpacker in accordance with an embodiment of the invention.

FIG. 4J is an exemplary illustration of a first data word load operation into a barrel shifter in a data unpacker in accordance with an embodiment of the invention. Referring to FIG. 4J, there is shown a barrel shifter 452, and a plurality of UMD cipher data units 466*a*, 466*b*, 466*c*, 466*d*, 466*e*, 466*f*, 466*g*, and 466*h*. The plurality of UMD cipher data units 466*a*, 466*b*, 466*c*, 464*d*, 466*e*, 466*f*, 466*g*, and 466*h* may comprise a first long data word in a data block. The first long data word may be retrieved from the cipher engine 408, and loaded into the barrel shifter 452. In operation, the plurality of UMD cipher data units 466a, 466b, 466c, 466d, 466e, 466f, 466g, and 466h may be generated by the operation of the cipher engine 408 during ciphering of received clear text data. The barrel shifter 452 may perform subsequent bit shifting and/or bit stuffing operations that insert bits in the first data word. The inserted bits may subsequently be utilized to contain MAC and/or RLC header information.

Figure 4K:
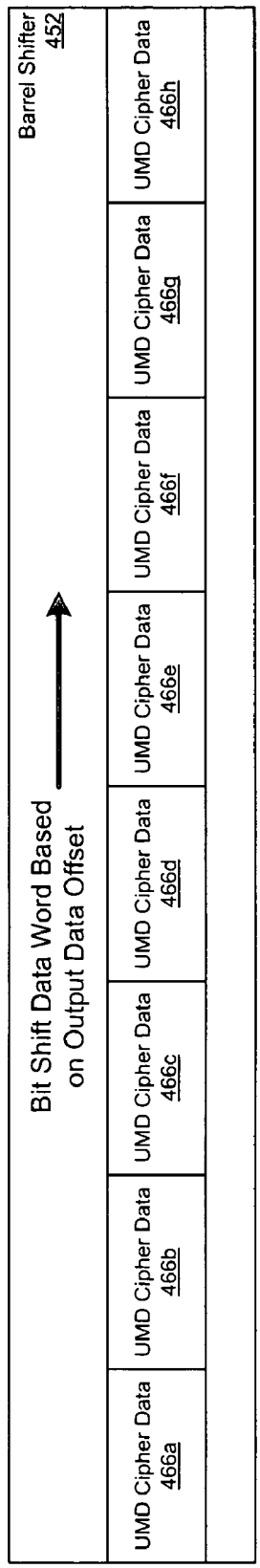
FIG. 4K is an exemplary illustration of a bit shifting operation on a data word in a data unpacker in accordance with an embodiment of the invention.

FIG. 4K is an exemplary illustration of a bit shifting operation on a data word in a data unpacker in accordance with an embodiment of the invention. Referring to FIG. 4K, there is shown a barrel shifter 452, and a plurality of UMD cipher data units 466a, 466b, 466c, 466d, 466e, 466f, 466g, and 466h. The barrel shifter 452 may perform a bit shifting operation on the loaded data word based on an output data offset. The output data offset may determine a number of bit positions in connection with the bit shifting operation.

Figure 4L:
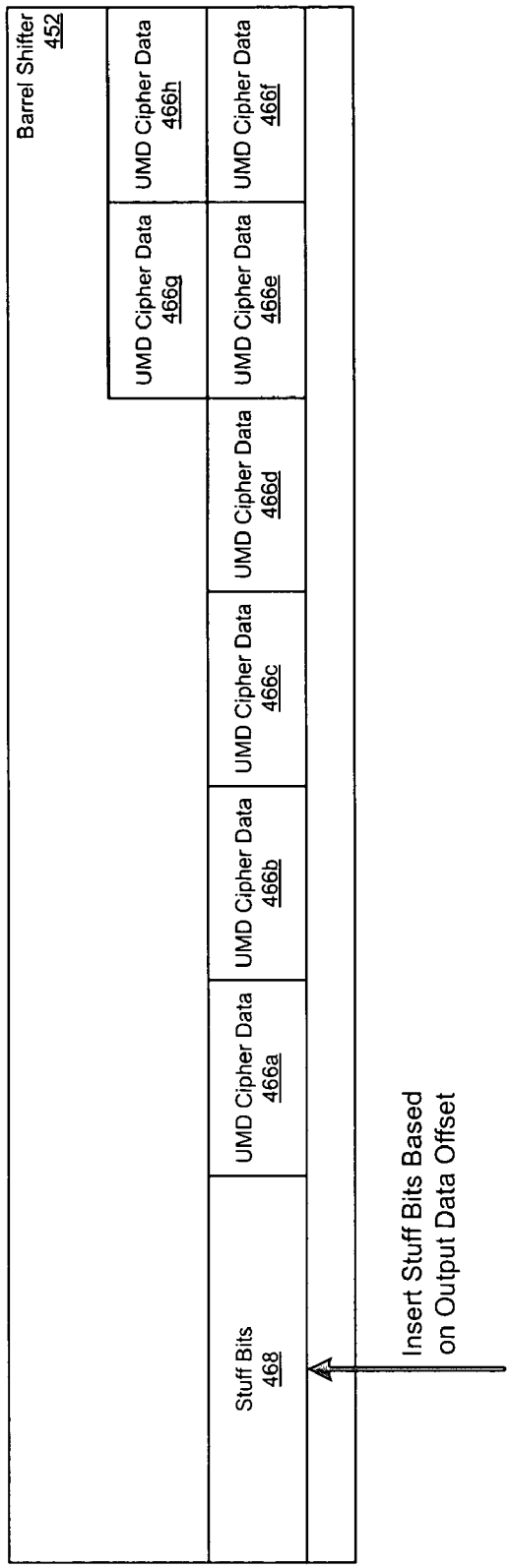
FIG. 4L is an exemplary illustration of a bit stuffing operation on a data word in a data unpacker in accordance with an embodiment of the invention.

FIG. 4L is an exemplary illustration of a bit stuffing operation on a data word in a data unpacker in accordance with an embodiment of the invention. Referring to FIG. 4L, there is shown a barrel shifter 452, a plurality of UMD cipher data units 466a, 466b, 466c, 466d, 466e, 466f, 466g, and 466h, and stuff bits 468.

A bit stuffing operation has been performed on the first long data word and a bit stuffed first long data word shown in FIG. 4L. The bit stuffed long data word may comprise the stuff bits 468, and the plurality of UMD cipher data units 466a, 466b, 466c, 466d, 466e, 466f, 466g, and 466h. The stuff bits 468 may represent inserted bits as a result of a bit stuffing operation. The corresponding output data offset, which was utilized during the bit stuffing operation within the barrel shifter 424, may correspond to the number of bits contained in a MAC and/or RLC header.

Figure 4M:
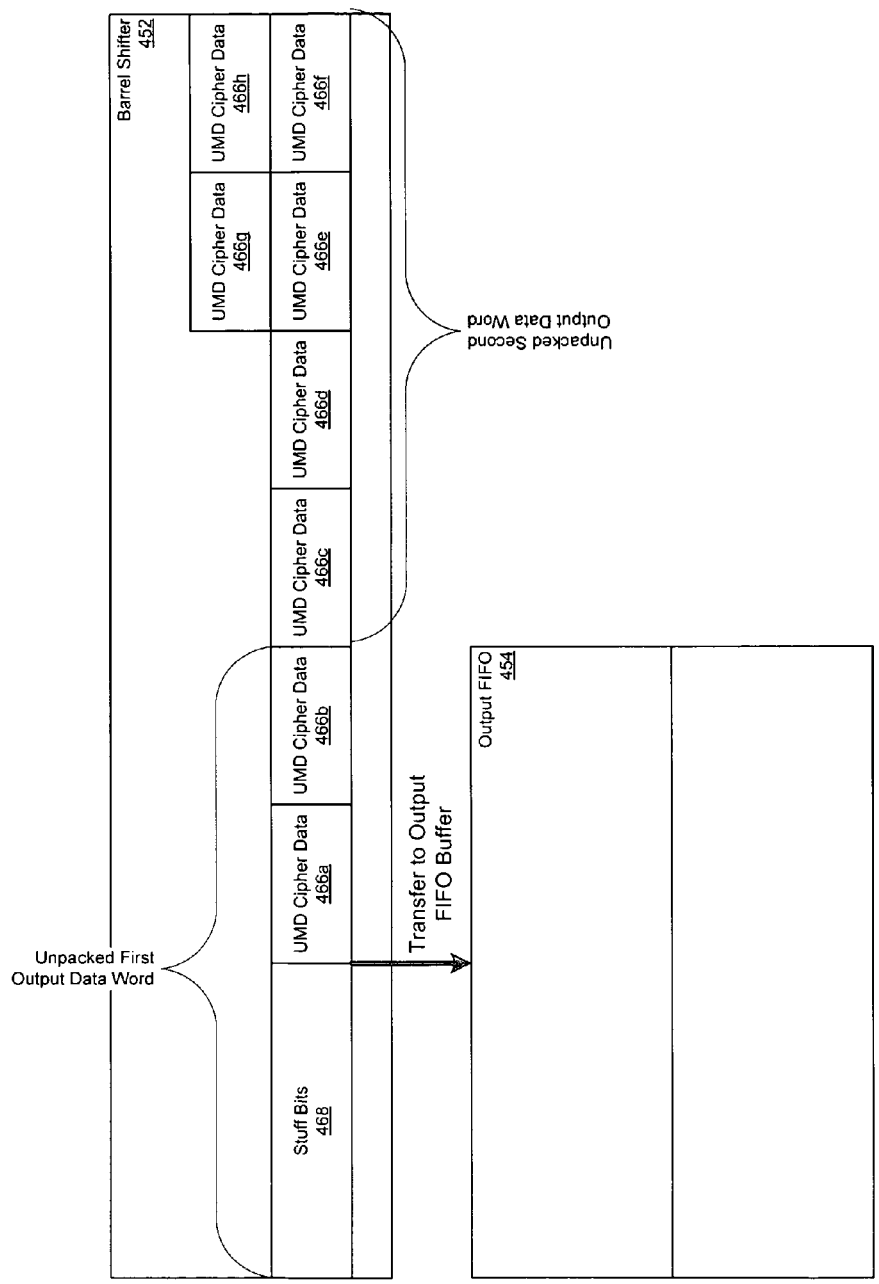
FIG. 4M is an exemplary illustration of a loaded barrel shifter in a data unpacker in accordance with an embodiment of the invention.

FIG. 4M is an exemplary illustration of a loaded barrel shifter in a data unpacker in accordance with an embodiment of the invention. Referring to FIG. 4M, there is shown a barrel shifter 452, an output FIFO buffer 454, a plurality of UMD cipher data units 466a, 466b, 466c, 466d, 466e, 466f, 466g, 466h, and stuff bits 468. The stuff bits 468, and a portion of the bits from the first long data word, comprising UMD cipher data units 466a, 466b, 466c, 466d, 466e, 466f, and 466g may form a first output long data word from the barrel shifter 452 after bit stuffing. The first output long data word may be split into two individual output data words as a result of a bit unpacking operation. The first output data word may comprise the stuff bits 468, and the portion of the UMD cipher data units 466a, 466b, or 466c based on the output offset. For example, if the output offset is 16, then the first output data word comprise the 16 stuff bits 468, UMD cipher data units 466a and 466b. The second output data word comprises UMD cipher data units 466c, 466d, 466e, and 466f. In this example, the UMD cipher data unit 466g and 466h may continue to be stored in the barrel shifter 452 to be output in a subsequent output data word.

Figure 4N:
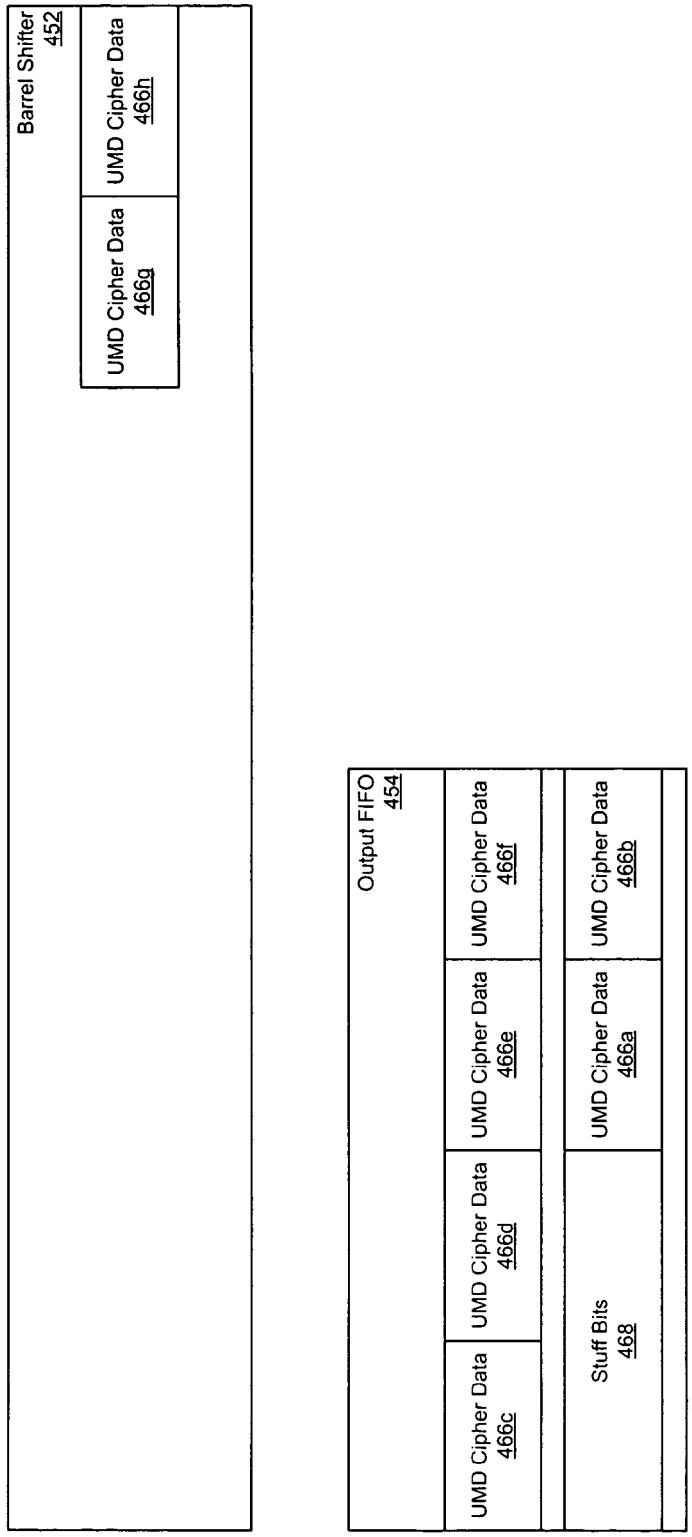
FIG. 4N is an exemplary illustration of a packed data unit load into an output FIFO buffer in a data unpacker in accordance with an embodiment of the invention.

FIG. 4N is an exemplary illustration of a packed data unit load into an output FIFO buffer in a data unpacker in accordance with an embodiment of the invention. Referring to FIG. 4N, there is shown a barrel shifter 452, an output FIFO buffer 454, a plurality of UMD cipher data units 466a, 466b, 466c, 466d, 466e, 466f, 466g, and 466h, and stuff bits 468. The first unpacked output data word, comprising the stuff bits 468, and UMD cipher data units 466a, 466b may be transferred from the barrel shifter 452 to a location within the output FIFO buffer 454. The second unpacked output data word, comprising the UMD cipher data units 466c, 466d, 466e, 466f may be transferred from the barrel shifter 452 to a second location within the output FIFO buffer 454. The UMD cipher data units 466g and 466h may continue to be stored in the barrel shifter 452 subsequent to the transfer of the first and second unpacked output data words.

Figure 5:
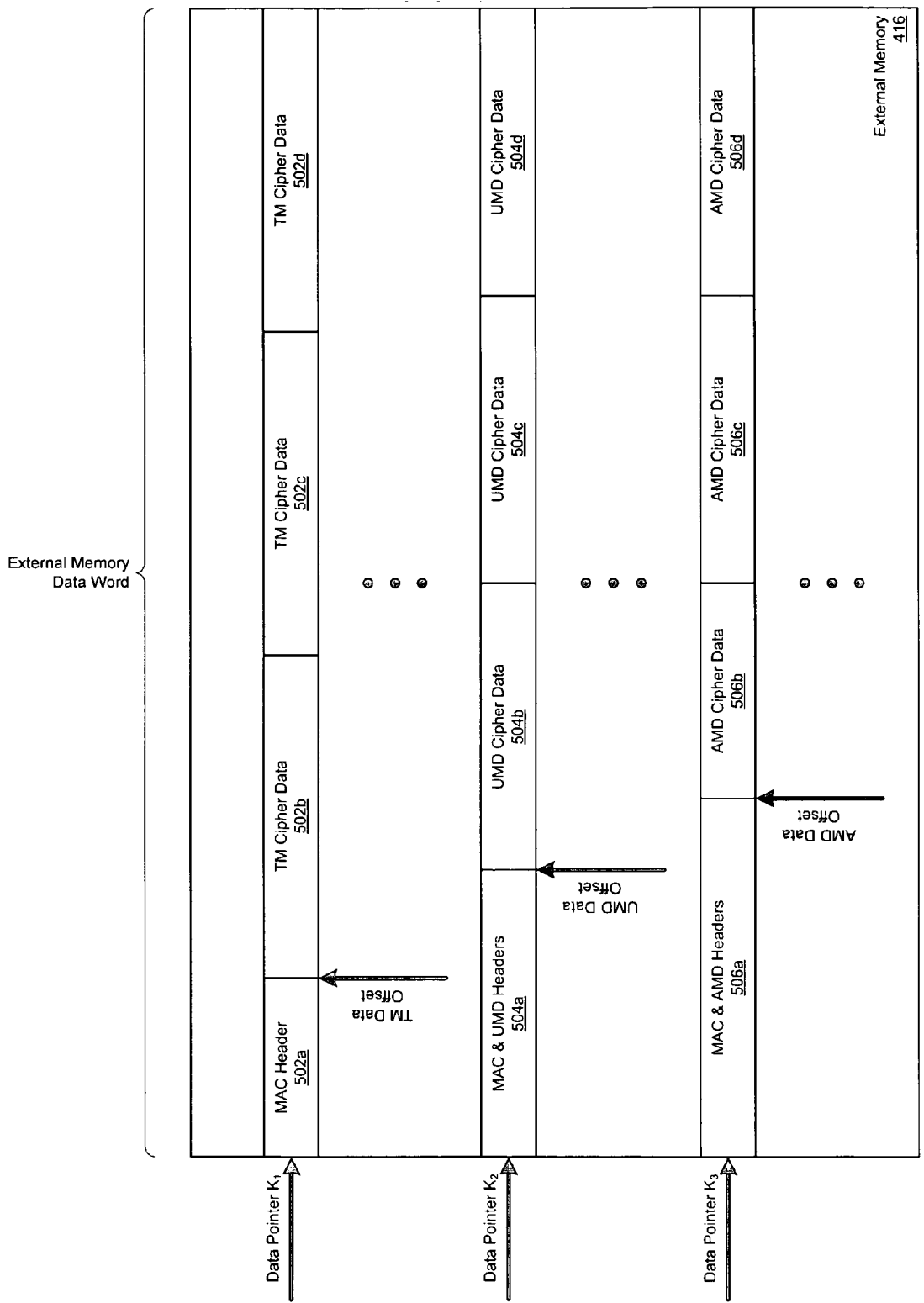
FIG. 5 is an illustration of exemplary access to data blocks stored in external memory in accordance with an embodiment of the invention.

FIG. 5 is an illustration of exemplary access to data blocks stored in external memory in accordance with an embodiment of the invention. Referring to FIG. 5, there is shown an external memory 416. The external memory 416 may comprise a plurality of bits arranged in rows. Each row may comprise a data word. Stored within the external memory 416 may be a MAC header 502a, a plurality of TM cipher data units 502b, 502c, and 502d, MAC and a UMD headers 504a, a plurality of UMD cipher data units 504b, 504c, and 504d, MAC and AMD headers 506a, and a plurality of AMD cipher data units 506b, 506c, and 506d.

A TM de-ciphering data block within the external memory 416 may comprise the MAC header 502a, and TM cipher data units 502b, 502c, and 502d. The UMD header in part of 504a may represent the header 200b in a UMD PDU 200a. The UMD cipher data units 504b, 504c, and 504d may represent portions of a ciphering unit 200c in a UMD PDU 200a. A UMD de-ciphering data block within the external memory 416 may comprise the MAC and UMD headers 504a, and the UMD cipher data units 504b, 504c, and 504d. The AMD header in part of 506a may represent the header 300b in an AMD PDU 300a. The AMD cipher data units 506b, 506c, and 506d may represent portions of a ciphering unit 300c in an AMD PDU 300a. An AMD de-ciphering data block within the external memory 416 may comprise MAC and the AMD headers 506a, and the AMD cipher data units 506b, 506c, and 506d.

A TM data block may be retrieved from external memory 416 based on a data pointer value $K_1$. The data pointer may represent an address that refers to a location within the external memory 416. The external memory 416 may utilize the data pointer data pointer value $K_1$ to access a data word for which the first bit may be located at the location referred to by the data pointer value $K_1$. The cipher module 404 may perform ciphering, deciphering, bit stuffing, and/or bit unstuffing operations on the TM data block based on an input TM data offset, and/or output TM data offset. The TM data offset may indicate the start of the ciphering unit 100b within the TM data block.

A UMD data block may be retrieved from external memory 416 based on a data pointer value $K_2$. The data pointer may represent an address that refers to a location within the external memory 416. The external memory 416 may utilize the data pointer data pointer value $K_2$ to access a data word for which the first bit may be located at the location referred to by the data pointer value $K_2$. The cipher module 404 may perform ciphering, deciphering, bit stuffing, and/or bit unstuffing operations on the UMD data block based on an output UMD data offset, and/or input UMD data offset. The UMD input offset may indicate the start of the ciphering unit 200b within the UMD data block. The cipher module 404 may perform bit unstuffing operations and/or bit stuffing operations based on the UMD data offsets.

An AMD data block may be retrieved from external memory 416 based on a data pointer value $K_3$. The data pointer may represent an address that refers to a location within the external memory 416. The external memory 416 may utilize the data pointer data pointer value $K_3$ to access a data word for which the first bit may be located at the location referred to by the data pointer value $K_3$. The cipher module 404 may perform ciphering, deciphering, bit stuffing, and/or bit unstuffing operations on the AMD data block based on an output AMD offset, and/or input AMD offset. The AMD data offset may indicate the start of the ciphering unit 300b within the AMD data block. The cipher module 404 may perform bit unstuffing operations and/or bit stuffing operations based on the AMD data offsets.

Figure 6A:
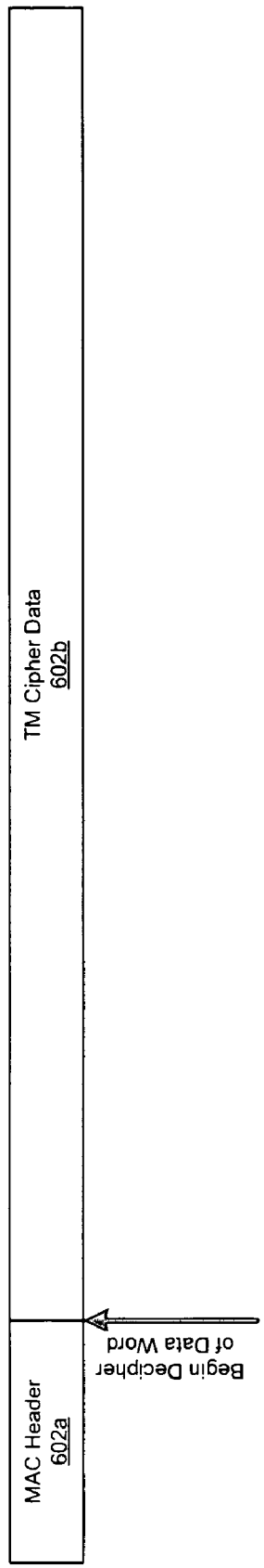
FIG. 6A is a diagram illustrating exemplary deciphering of encrypted data received in a TM data block in accordance with an embodiment of the invention.

FIG. 6A is a diagram illustrating exemplary deciphering of encrypted data received in a TM data block in accordance with an embodiment of the invention. Referring to FIG. 6A, there is shown a MAC header 602a, and a TM cipher data unit 602b. The TM cipher data unit 602b may comprise a data word or multiple of data words. The TM cipher data unit 602b may be retrieved from external memory 416. The cipher engine 408 may begin deciphering at the beginning of the TM cipher data unit 602b. The beginning of the TM cipher data unit 602b may be determined based on a data offset.

Figure 6B:
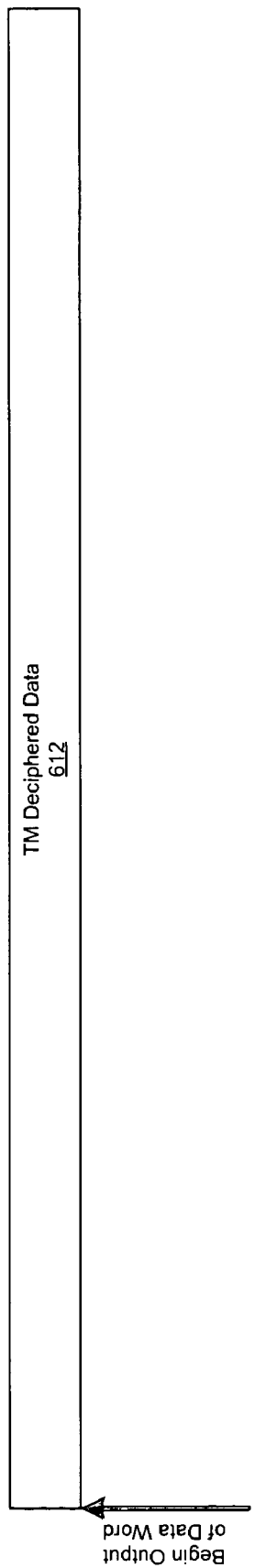
FIG. 6B is a diagram illustrating exemplary output of deciphered data received in a TM data block in accordance with an embodiment of the invention.

FIG. 6B is a diagram illustrating exemplary output of deciphered data received in a TM data block in accordance with an embodiment of the invention. Referring to FIG. 6B, there is shown a TM deciphered data unit 612. The TM deciphered data unit 612 may be generated by the cipher engine 408. The data unpacker 412 may begin output data at a location corresponding to the beginning of the TM deciphered data unit 612. The beginning of the TM deciphered data unit 612 may be determined based on a data offset. In this instance, the value of the data offset may be equal to 0.

Figure 7A:
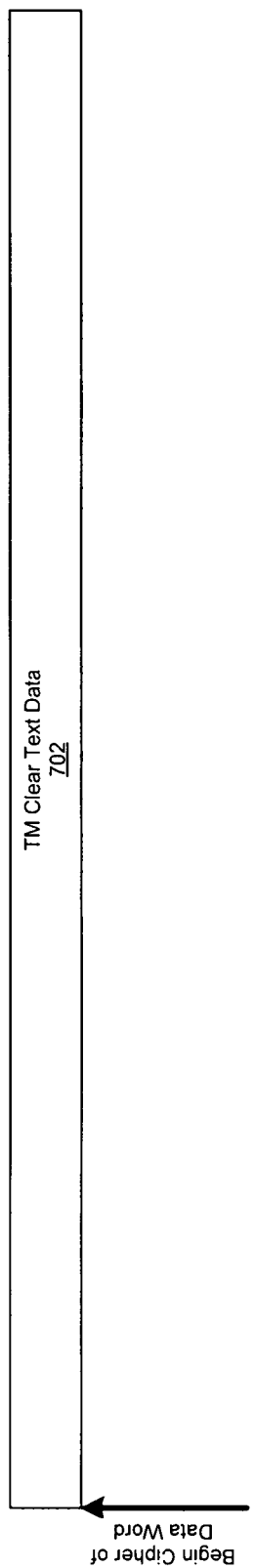
FIG. 7A is a diagram illustrating exemplary ciphering of unencrypted data to be transmitted in a TM PDU in accordance with an embodiment of the invention.

FIG. 7A is a diagram illustrating exemplary ciphering of unencrypted data to be transmitted in a TM PDU in accordance with an embodiment of the invention. Referring to FIG. 7A, there is shown a TM clear text data unit 702. The TM clear text data unit 702 may comprise a data word or multiple of data words. The TM clear text data unit 702 may be retrieved from external memory 416. The cipher engine 408 may begin ciphering at the beginning of the TM clear text data unit 702.

Figure 7B:
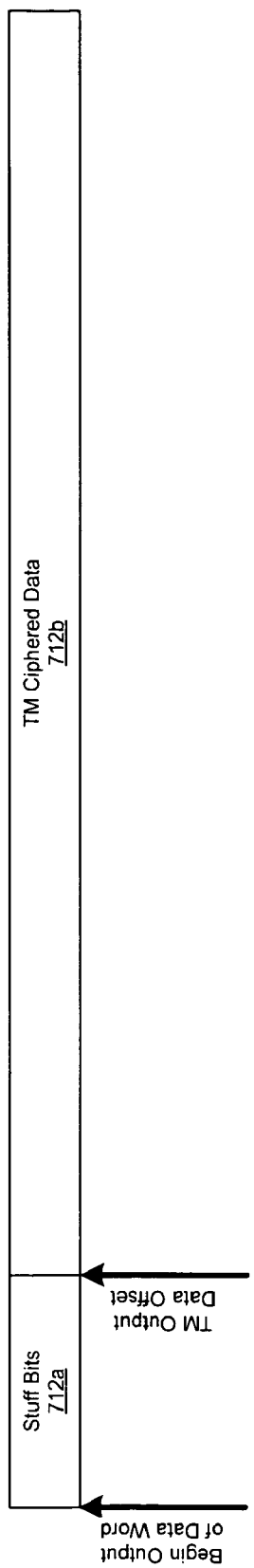
FIG. 7B is a diagram illustrating exemplary output of ciphered data received in a TM data block in accordance with an embodiment of the invention.

FIG. 7B is a diagram illustrating exemplary output of ciphered data received in a TM data block in accordance with an embodiment of the invention. Referring to FIG. 7B, there is shown stuff bits 712a, and a TM ciphered data unit 712b. The TM ciphered data unit 712b may be generated by the cipher engine 408. The stuff bits may be inserted by the data unpacker 412 based on an output data offset. The data unpacker 412 may begin output data at a location corresponding to the beginning of the stuff bits 712a. The beginning of the TM ciphered data unit 712b may be determined based on a data offset. In this instance, the value of data offset may be nonzero.

Figure 8A:
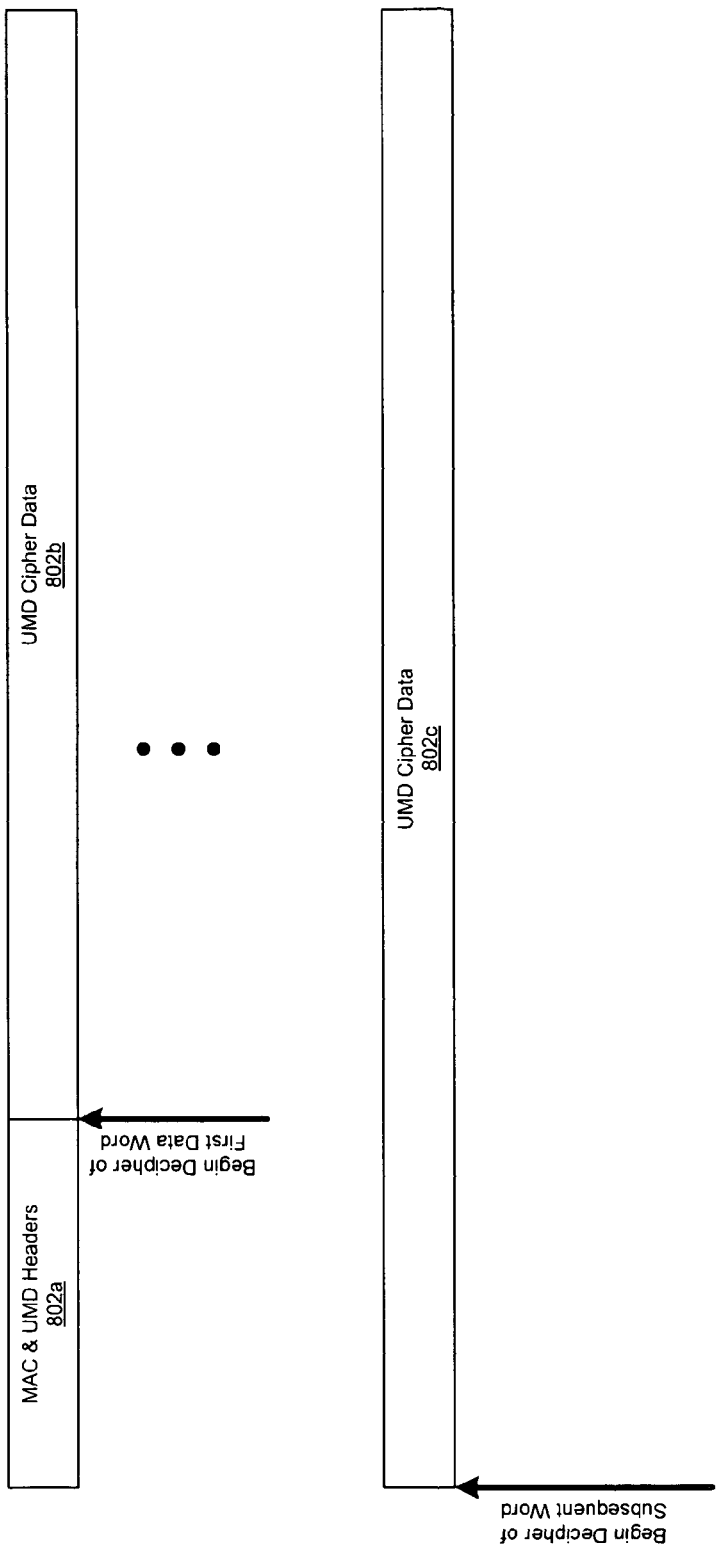
FIG. 8A is a diagram illustrating exemplary deciphering of encrypted data received in a UMD data block in accordance with an embodiment of the invention.

FIG. 8A is a diagram illustrating exemplary deciphering of encrypted data received in a UMD data block in accordance with an embodiment of the invention. Referring to FIG. 8A, there is shown MAC and UMD headers 802a, and UMD cipher data units 802b, and 802c. The MAC and UMD headers 802a and UMD cipher data unit 802b may comprise a data word. The UMD cipher data unit 802c may comprise a data word. The UMD cipher data unit 802b may comprise a first portion of a UMD data block. The UMD cipher data unit 802c may comprise a subsequent portion of the UMD data block. The UMD header in 802a comprises bits in the header from the UMD PDU 200a. The MAC and UMD headers 802a and UMD cipher data unit 802b may comprise a data word that may be retrieved from external memory 416. The UMD cipher data unit 802c may comprise a data word that may be retrieved from external memory 416. The cipher engine 408 may begin deciphering the UMD data block at the beginning of the UMD cipher data unit 802b. The cipher engine 408 may begin ciphering a subsequent portion of the UMD cipher data block at the beginning of the UMD cipher unit 802c. The location of the beginning of the UMD cipher data unit 802b may be based on an offset, such as the UMD data offset (FIG. 5), for example.

Figure 8B:
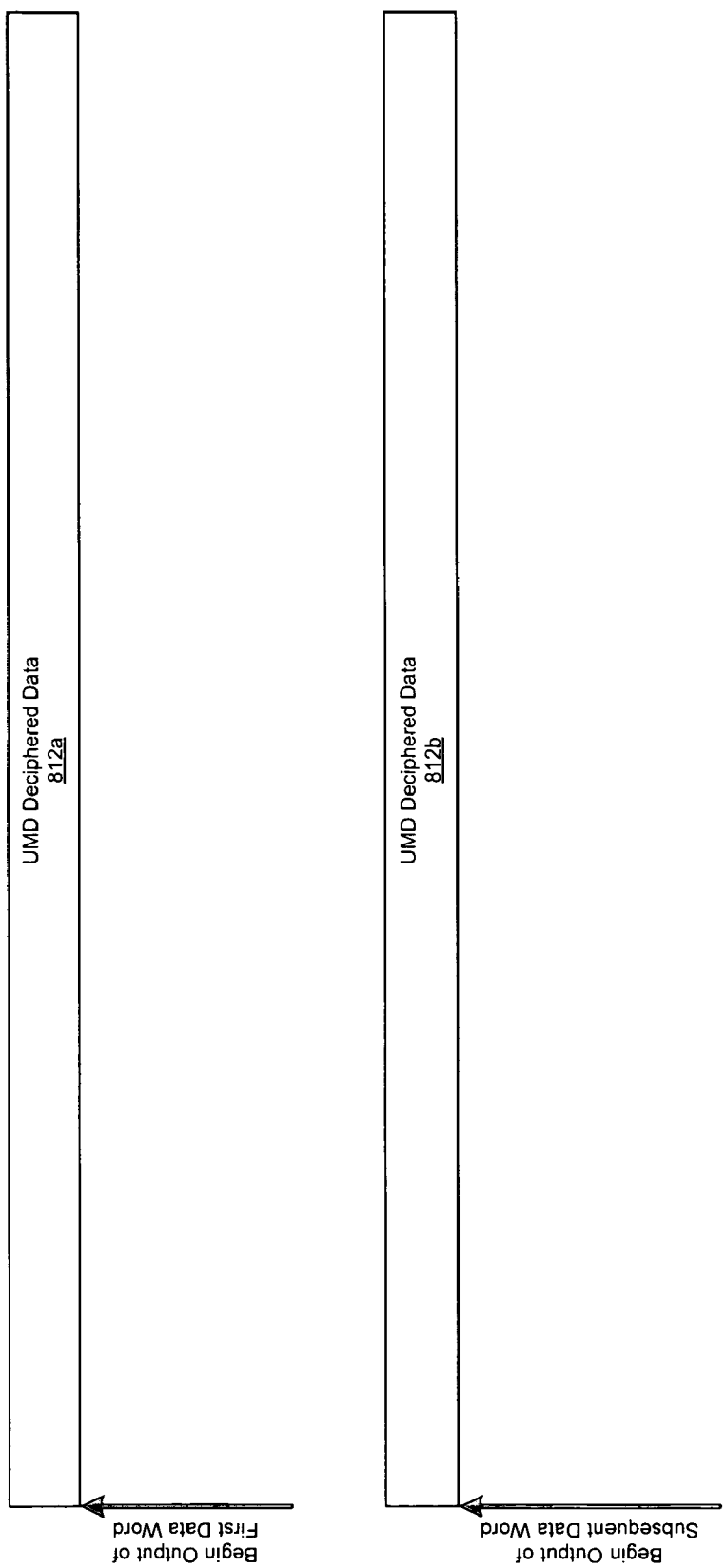
FIG. 8B is a diagram illustrating exemplary output of deciphered data received in a UMD data block in accordance with an embodiment of the invention.

FIG. 8B is a diagram illustrating exemplary output of deciphered data received in a UMD data block in accordance with an embodiment of the invention. Referring to FIG. 8B, there is shown a plurality of UMD deciphered data units 812a and 812b. The plurality of UMD deciphered data units 812a and 812b may be generated by the cipher engine 408. The UMD deciphered data unit 812a may represent a first UMD deciphered data unit 812a in a deciphered data block. The UMD deciphered data unit 812b may represent a subsequent UMD deciphered data unit in a deciphered data block. The data unpacker 412 may begin output of data in the first UMD deciphered data unit 812a at a location corresponding to the beginning of the UMD deciphered data unit 812a. The beginning of the UMD deciphered data unit 812a may be determined based on a data offset. In this instance, the value of the data offset may be equal to 0. The data unpacker 412 may begin output of data in the subsequent UMD deciphered data unit 812b at a location corresponding to the beginning of the UMD deciphered data unit 812b.

Figure 9A:
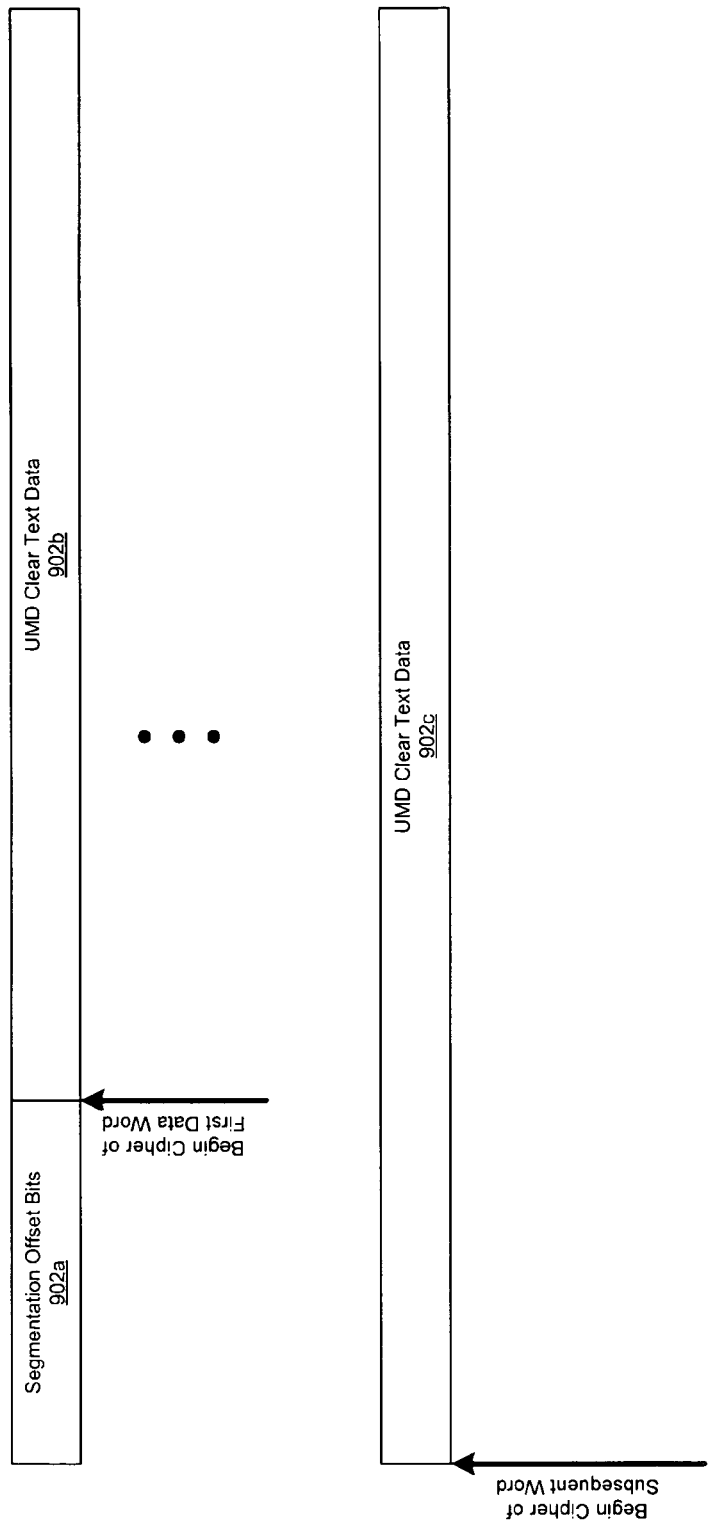
FIG. 9A is a diagram illustrating exemplary ciphering of unencrypted data to be transmitted in a UMD PDU in accordance with an embodiment of the invention.

FIG. 9A is a diagram illustrating exemplary ciphering of unencrypted data to be transmitted in a UMD PDU in accordance with an embodiment of the invention. Referring to FIG. 9A, there is shown segmentation offset bits 902a, and UMD clear text data units 902b, and 902c. The segmentation offset bits 902a and UMD clear text data unit 902b may comprise a data word. The UMD clear text data unit 902c may comprise a data word. The UMD clear text data unit 902b may comprise a first portion of a UMD data block. The UMD clear text data unit 902c may comprise a subsequent portion of the UMD data block. The segmentation offset bits 902a and UMD clear text data unit 902b may comprise a data word that may be retrieved from external memory 416. The UMD clear text data unit 902c may comprise a data word that may be retrieved from external memory 416. The cipher engine 408 may begin ciphering the UMD data block at the beginning of the UMD clear text data unit 902b. The cipher engine 408 may begin ciphering a subsequent portion of the UMD data block at the beginning of the UMD clear text unit 902c. The location of the beginning of the UMD clear text data unit 902b may be based on an offset, such as the UMD data offset (FIG. 5), for example.

Figure 9B:
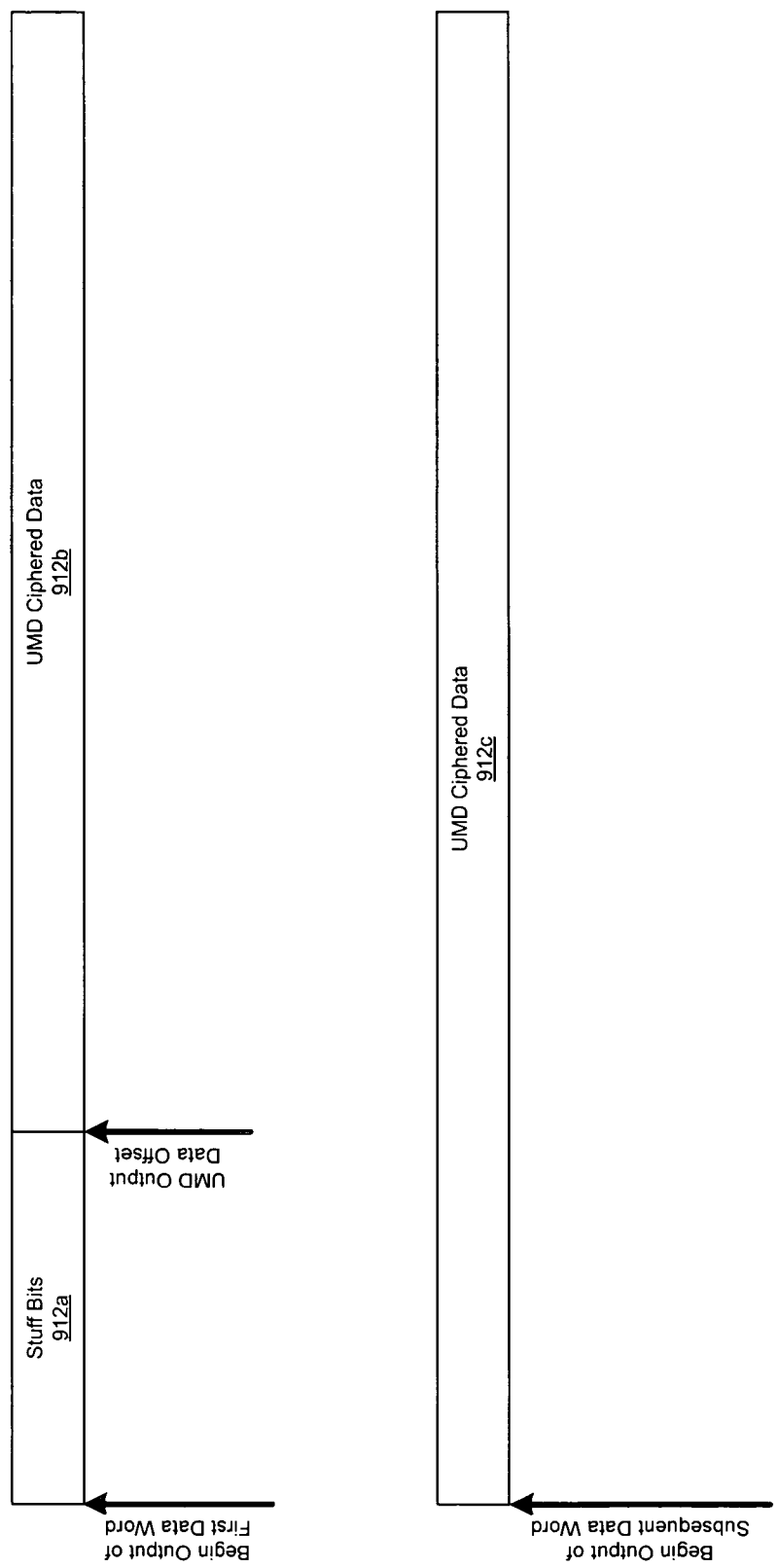
FIG. 9B is a diagram illustrating exemplary output of ciphered data received in a UMD data block in accordance with an embodiment of the invention.

FIG. 9B is a diagram illustrating exemplary output of ciphered data received in a UMD data block in accordance with an embodiment of the invention. Referring to FIG. 9B, there is shown stuff bits 912a, and a plurality of UMD ciphered data units 912a and 912b. The plurality of UMD ciphered data units 912a, and 912b may be generated by the cipher engine 408. The UMD ciphered data unit 912a may represent a first UMD ciphered data unit in a deciphered data block. The UMD ciphered data unit 912b may represent a subsequent UMD ciphered data unit in a deciphered data block. The stuff bits may be inserted by the data unpacker 412 based on an output data offset. The data unpacker 412 may begin output of data in the first UMD ciphered data unit at a location corresponding to the beginning of the stuff bits 912a. The beginning of the UMD ciphered data unit 912b may be determined based on a data offset. In this instance, the value of data offset may be nonzero. The data unpacker 412 may begin output of data in the subsequent UMD ciphered data unit 912c at a location corresponding to the beginning of the UMD ciphered data unit 912c.

Figure 10A:
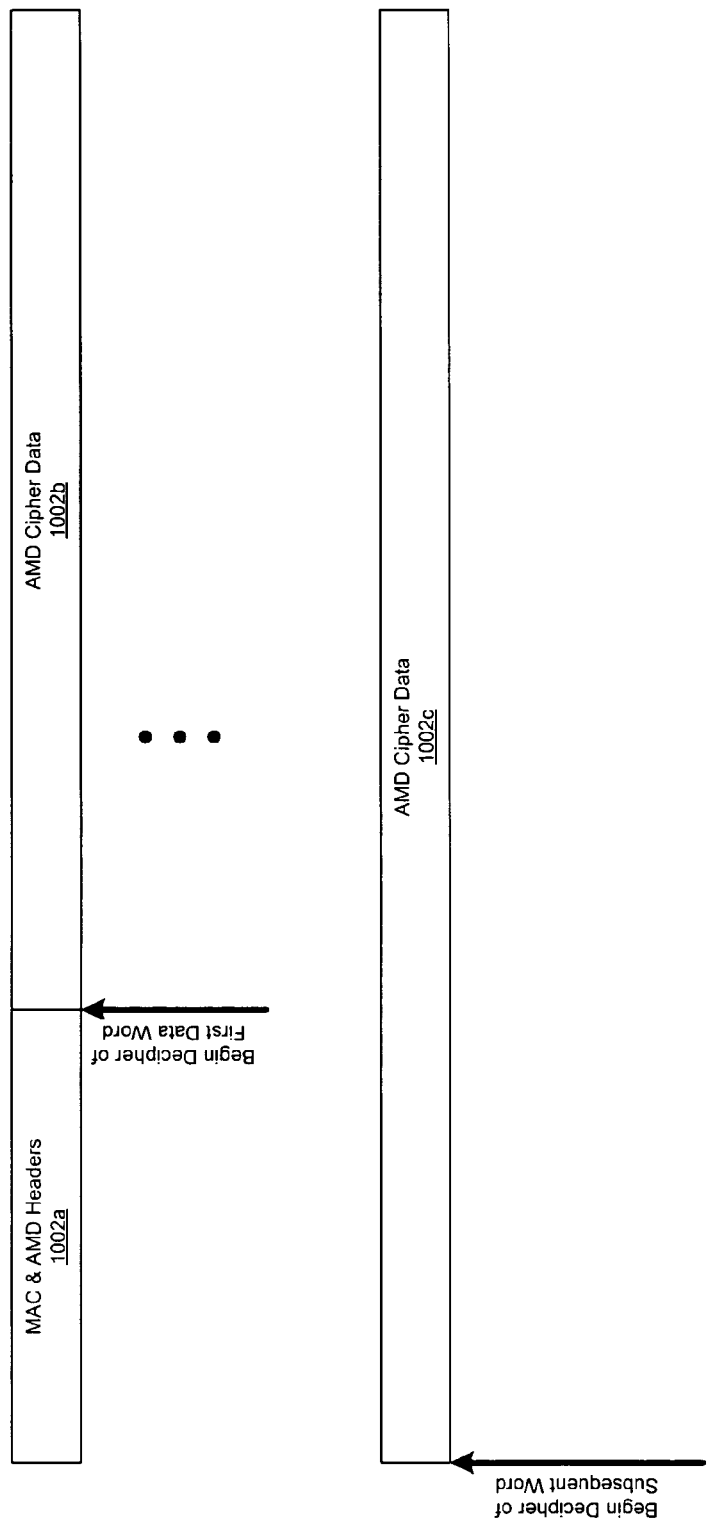
FIG. 10A is a diagram illustrating exemplary deciphering of encrypted data received in an AMD data block in accordance with an embodiment of the invention.

FIG. 10A is a diagram illustrating exemplary deciphering of encrypted data received in an AMD data block in accordance with an embodiment of the invention. Referring to FIG. 10A, there is shown MAC and AMD headers 1002a, and AMD cipher data units 1002b, and 1002c. The MAC and AMD headers 1002a and AMD cipher data unit 1002b may comprise a data word. The AMD cipher data unit 1002c may comprise a data word. The AMD cipher data unit 1002b may comprise a first portion of an AMD data block. The AMD cipher data unit 1002c may comprise a subsequent portion of the AMD data block. The AMD header in 1002a may comprise bits in the header from the AMD PDU 300a. The MAC and AMD headers 1002a and AMD cipher data unit 1002b may comprise a data word that may be retrieved from external memory 416. The AMD cipher data unit 1002c may comprise a data word that may be retrieved from external memory 416. The cipher engine 408 may begin deciphering the AMD data block at the beginning of the AMD cipher data unit 1002b. The cipher engine 408 may begin ciphering a subsequent portion of the AMD data block at the beginning of the AMD cipher unit 1002c. The location of the beginning of the AMD cipher data unit 1002b may be based on an offset, such as the AMD data offset (FIG. 5), for example.

Figure 10B:
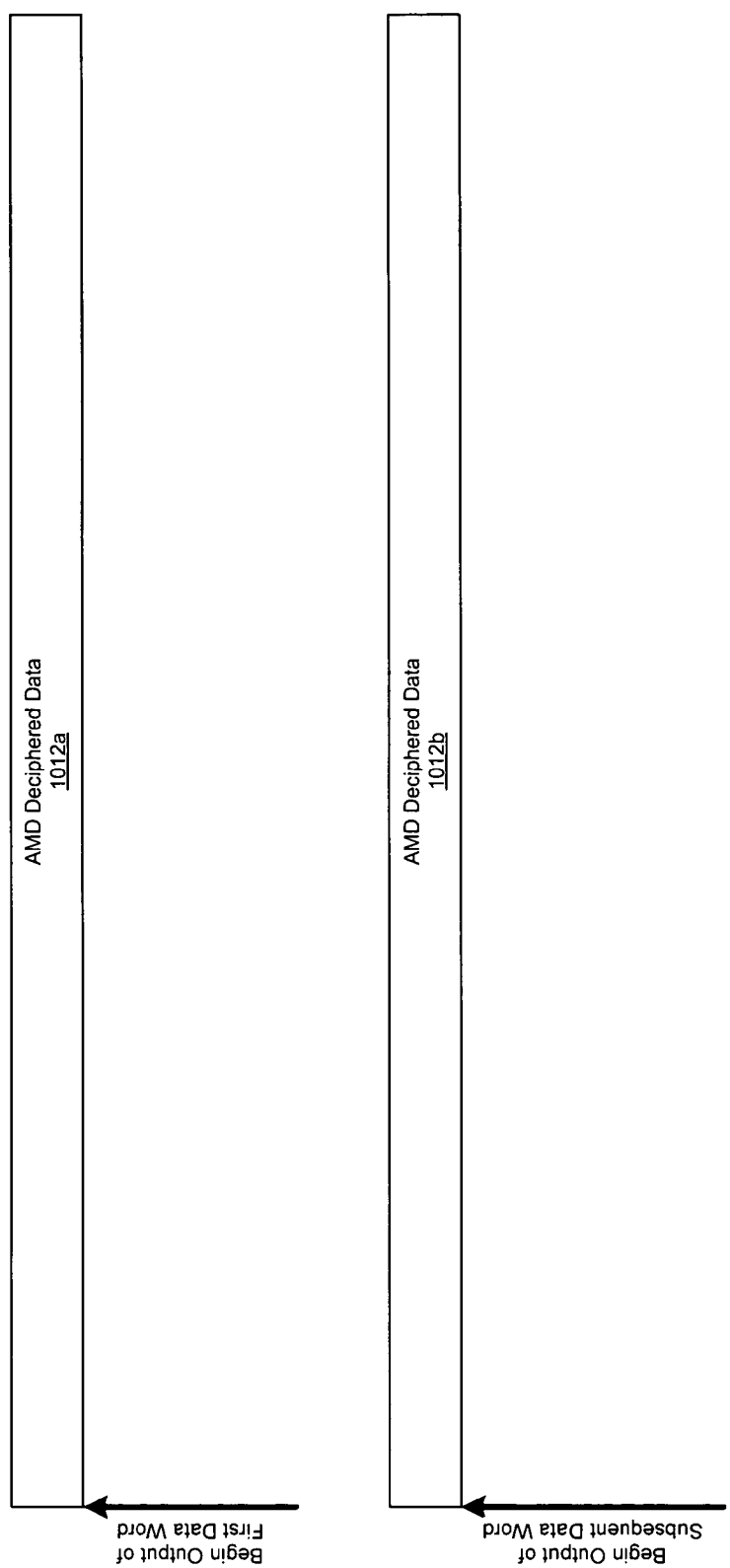
FIG. 10B is a diagram illustrating exemplary output of deciphered data received in an AMD data block in accordance with an embodiment of the invention.

FIG. 10B is a diagram illustrating exemplary output of deciphered data received in an AMD data block in accordance with an embodiment of the invention. Referring to FIG. 10B, there is shown a plurality of AMD deciphered data units 1012a and 1012b. The plurality of AMD deciphered data units 1012a and 1012b may be generated by the cipher engine 408. The AMD deciphered data unit 1012a may represent a first AMD deciphered data unit 1012a in a deciphered data block. The AMD deciphered data unit 1012b may represent a subsequent AMD deciphered data unit in a deciphered data block. The data unpacker 412 may begin output of data in the first AMD deciphered data unit 1012a at a location corresponding to the beginning of the AMD deciphered data unit 1012a. The beginning of the AMD deciphered data unit 1012a may be determined based on a data offset. In this instance, the value of the data offset may be equal to 0. The data unpacker 412 may begin output of data in the subsequent AMD deciphered data unit 1012b at a location corresponding to the beginning of the AMD deciphered data unit 1012b.

Figure 11A:
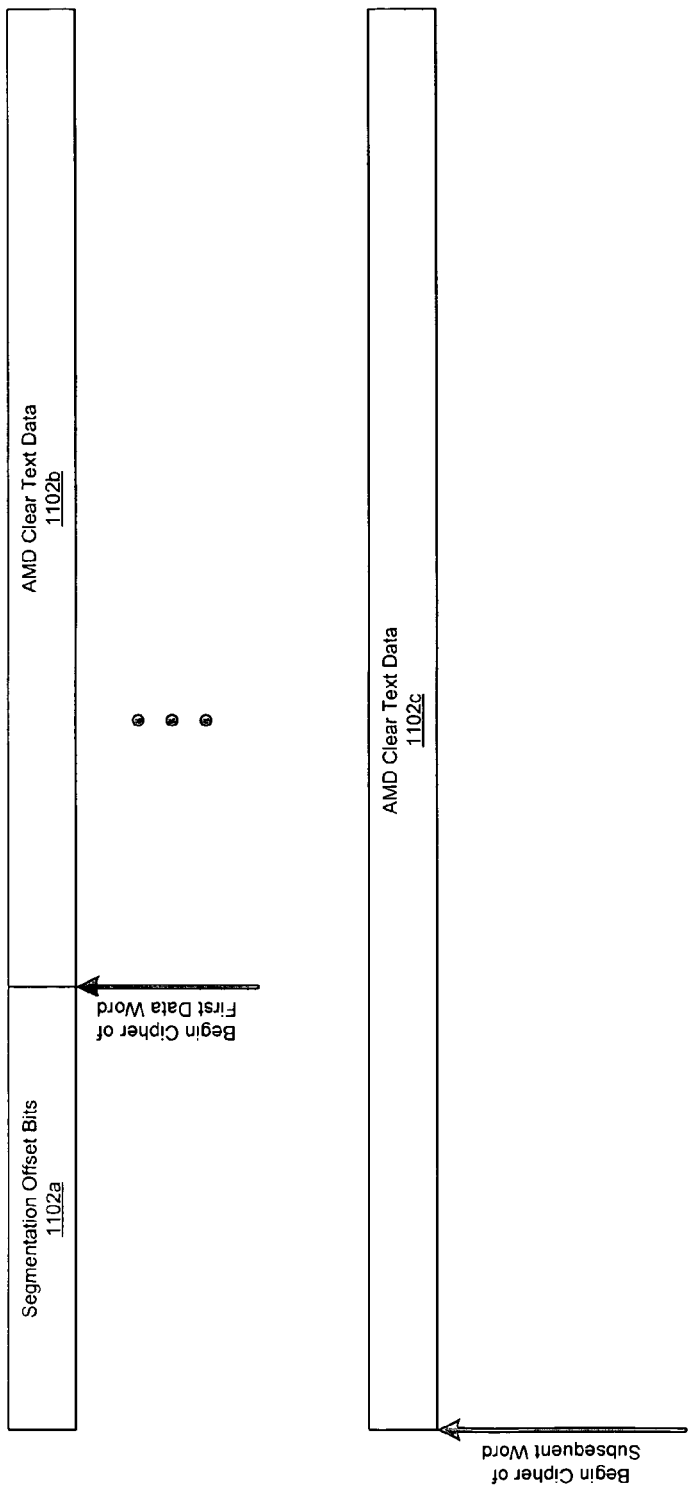
FIG. 11A is a diagram illustrating exemplary ciphering of unencrypted data to be transmitted in an AMD PDU in accordance with an embodiment of the invention.

FIG. 11A is a diagram illustrating exemplary ciphering of unencrypted data to be transmitted in an AMD PDU in accordance with an embodiment of the invention. Referring to FIG. 11A, there is shown segmentation offset bits 1102a, and AMD clear text data units 1102b, and 1102c. The segmentation offset bits 1102a and AMD clear text data unit 1102b may comprise a data word. The AMD clear text data unit 1102c may comprise a data word. The AMD clear text data unit 1102b may comprise a first portion of an AMD data block. The AMD clear text data unit 1102c may comprise a subsequent portion of the AMD data block. The segmentation offset bits 1102a and AMD clear text data unit 1102b may comprise a data word that may be retrieved from external memory 416. The AMD clear text data unit 1102c may comprise a data word that may be retrieved from external memory 416. The cipher engine 408 may begin ciphering the AMD data block at the beginning of the AMD clear text data unit 1102b. The cipher engine 408 may begin ciphering a subsequent portion of the AMD data block at the beginning of the AMD clear text unit 1102c. The location of the beginning of the AMD clear text data unit 1102b may be based on an offset, such as the AMD data offset (FIG. 5), for example.

Figure 11B:
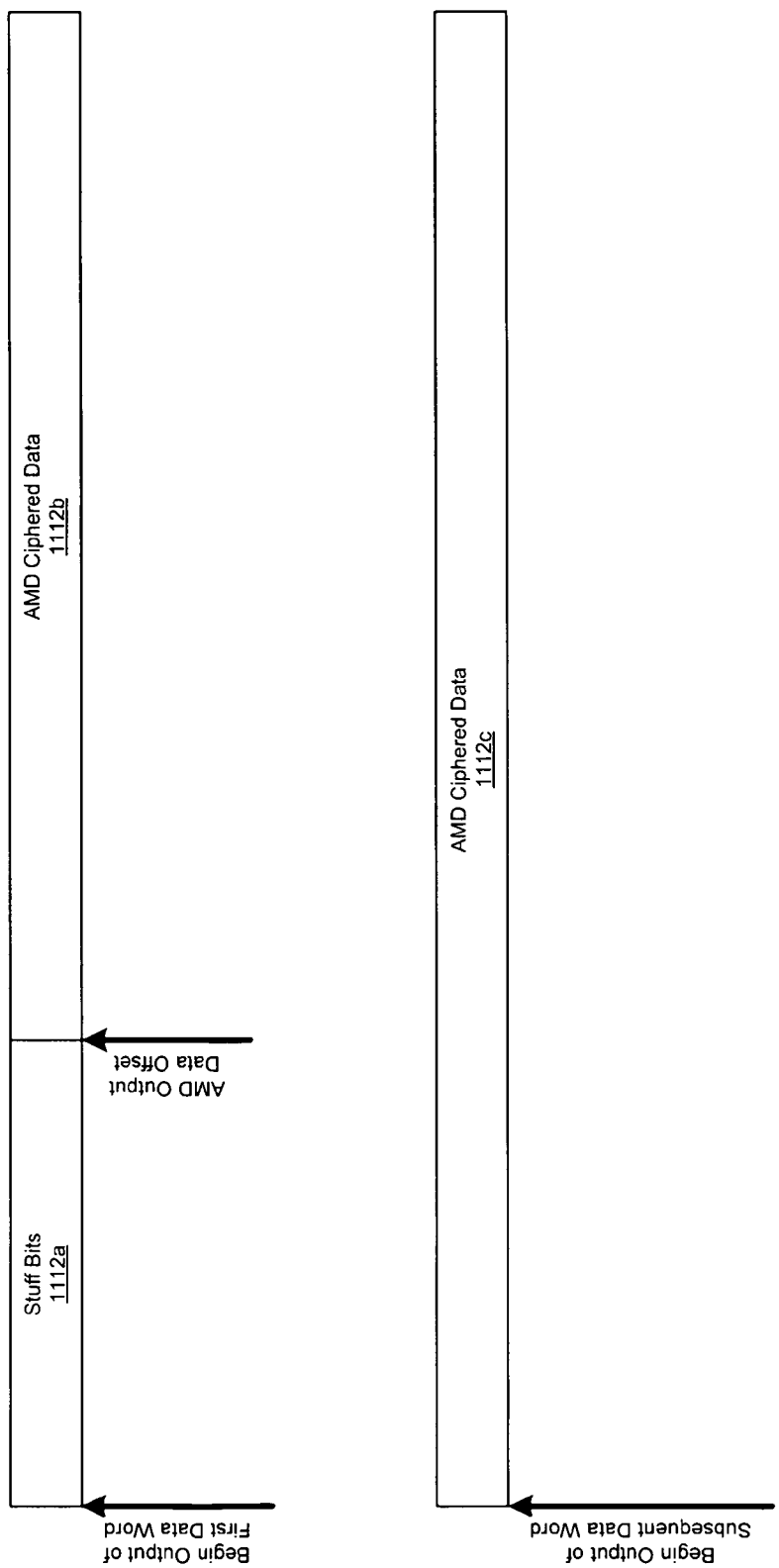
FIG. 11B is a diagram illustrating exemplary output of ciphered data received in an AMD data block in accordance with an embodiment of the invention.

FIG. 11B is a diagram illustrating exemplary output of ciphered data received in an AMD data block in accordance with an embodiment of the invention. Referring to FIG. 11B, there is shown stuff bits 1112a, and a plurality of AMD ciphered data units 1112a and 1112b. The plurality of AMD ciphered data units 1112a and 1112b may be generated by the cipher engine 408. The AMD ciphered data unit 1112a may represent a first AMD ciphered data unit in a deciphered data block. The AMD ciphered data unit 1112b may represent a subsequent AMD ciphered data unit in a deciphered data block. The stuff bits may be inserted by the data unpacker 412 based on an output data offset. The data unpacker 412 may begin output of data in the first AMD ciphered data unit at a location corresponding to the beginning of the stuff bits 1112a. The beginning of the AMD ciphered data unit 1112b may be determined based on a data offset. In this instance, the value of data offset may be nonzero. The data unpacker 412 may begin output of data in the subsequent AMD ciphered data unit 1112c at a location corresponding to the beginning of the AMD ciphered data unit 1112c.

Figure 12A:
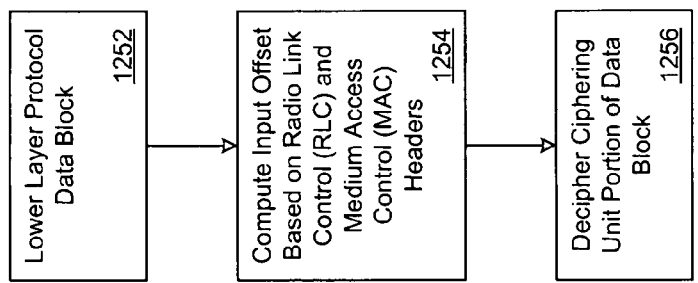
FIG. 12A is a flow chart illustrating steps in protocol processing for deciphering of encrypted data in accordance with an embodiment of the invention.

FIG. 12A is a flow chart illustrating steps in protocol processing for deciphering of encrypted data in accordance with an embodiment of the invention. Referring to FIG. 12A, in step 1252 a lower layer protocol (LLP) data block may be received. The LLP data block may be received from a physical layer protocol. In step 1254, an input data offset may be computed based on the RLC and MAC headers in the received LLP data block. In step 1256, the ciphering unit contained within the received data block may be deciphered. The beginning of the ciphering unit within the received LLP data block may be determined based on the computed input data offset.

Figure 12B:
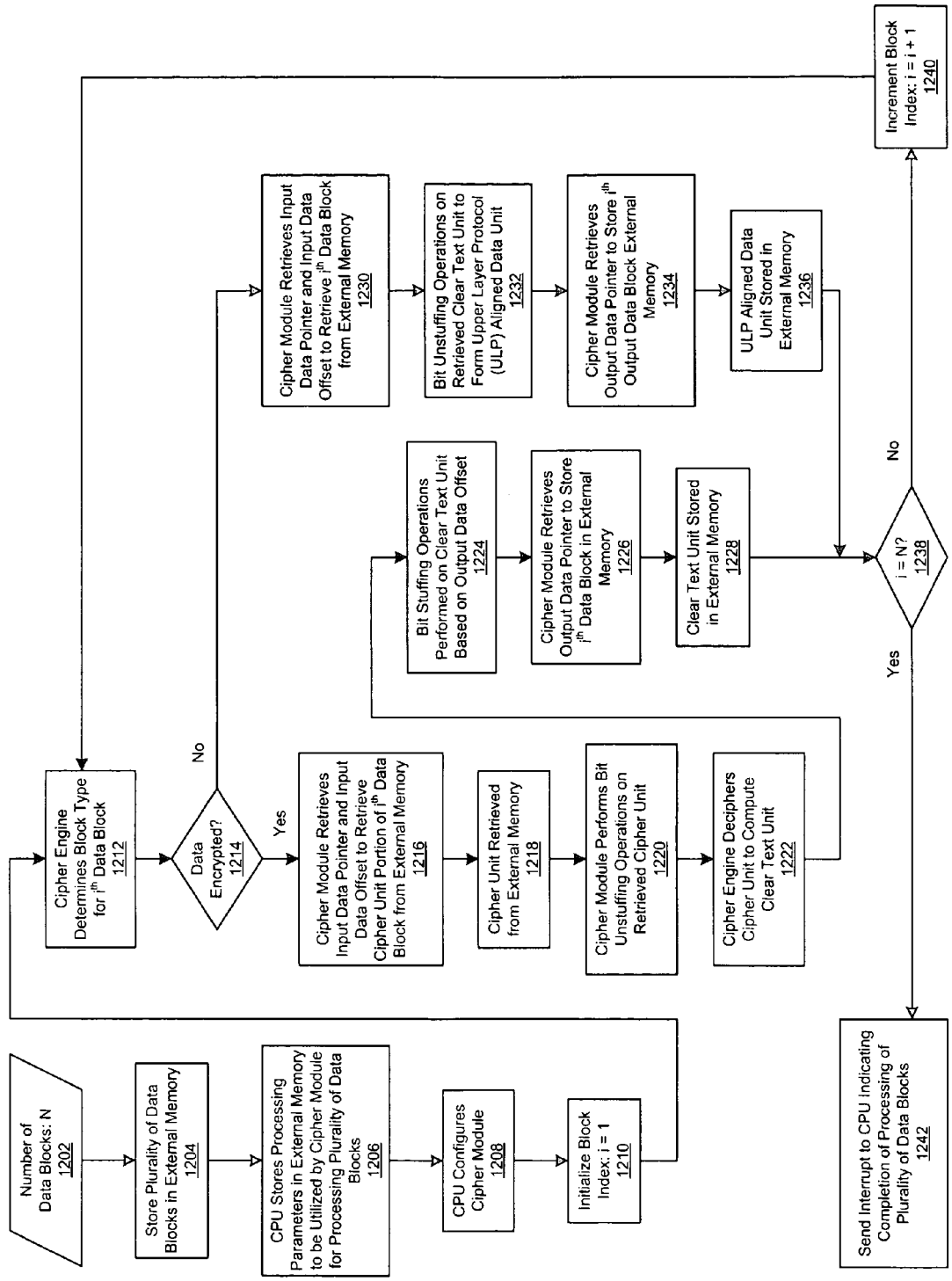
FIG. 12B is a flow chart illustrating exemplary steps for deciphering of encrypted data and list processing in accordance with an embodiment of the invention.

FIG. 12B is a flow chart illustrating exemplary steps for deciphering of encrypted data and list processing in accordance with an embodiment of the invention. Referring to FIG. 12B, in step 1202, the number of data blocks, N, to be processed by the cipher module 404 may be determined. In step 1204, a plurality of data blocks may be stored in external memory 416. In step 1206, the CPU 402 may store processing parameters in external memory 416 to be utilized by the cipher module 404 for processing the plurality of data blocks. In step 1208, the CPU 402 may configure the cipher module 404. The processing parameters may be accessed by the cipher module 404 based on the information configured in step 1206.

In step 1210, a block index, i, may be initialized to a value equal to 1. The block index may be utilized to determine an individual data block among the plurality of data blocks stored in external memory 416. In step 1212, the cipher engine 408 may determine the block type for the ith data block. A data block may be a TM data block if it comprises a TM PDU 100a, a UMD data block if it comprises a UMD PDU 200a, or an AMD data block if it comprises an AMD PDU 300a, for example. Step 1214 may determine if data contained in the ith data block is encrypted.

If step 1214 determines that there is encrypted data in the ith data block, in step 1216, the cipher module 404 may retrieve a corresponding input data pointer and input data offset to retrieve the cipher unit portion of the ith data block from external memory 416. In step 1218, the cipher unit may be retrieved from external memory 416. In step 1220, the cipher module 404 may perform bit unstuffing operations on the retrieved cipher unit. In step 1222, the cipher engine 408 may decipher the cipher unit to compute a clear text unit. In step 1224, bit stuffing operations may be performed on the clear text unit based on an output data offset. In one embodiment of the invention, the output data offset may be equal to 0. In this case, the corresponding number of stuff bits may be equal to 0. In step 1226, the cipher module 404 may retrieve a corresponding output data pointer to store the ith data block in external memory 416. In step 1228, the clear text unit may be stored in external memory 416.

Step 1238 may determine if the ith data block is the last data block among the plurality of data blocks stored in external memory 416. If the ith data block is the last data block, in step 1242, the cipher module 404 may send an interrupt to the CPU 402 indicating completion of processing of the plurality of data blocks. If step 1238 determines that the current data block is not the last data block, step 1240 may increment the block index. Step 1212 may follow step 1240.

If step 1214 determines that there is no encrypted data in the ith data block, in step 1230, the cipher module 404 may retrieve a corresponding input data pointer and input data offset to retrieve the ith data block from external memory 416. In step 1232, bit unstuffing operations may be performed on the retrieved clear text unit to form an upper layer protocol (ULP) aligned data unit. The bit unstuffing operation may be based on an output data offset. In step 1234, the cipher module 404 may retrieve a corresponding output data pointer to store the ith output data block to external memory 416. In step 1236, the ULP-aligned data unit may be stored in external memory 416. Step 1238 may follow step 1236.

Figure 13A:
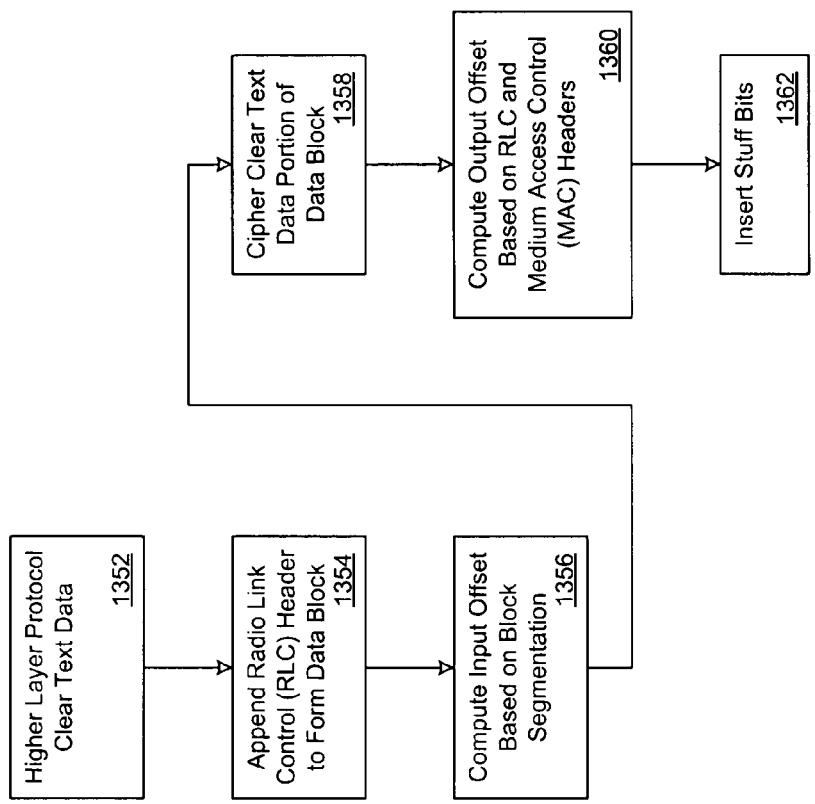
FIG. 13A is a flow chart illustrating exemplary steps for protocol processing for ciphering of unencrypted data in accordance with an embodiment of the invention.

FIG. 13A is a flow chart illustrating exemplary steps for protocol processing for ciphering of unencrypted data in accordance with an embodiment of the invention. Referring to FIG. 13A, in step 1352, clear text data may be received from a higher layer protocol (HLP). In step 1354, an RLC header, for example an AMD header or a UMD header, may be appended to the clear text data received from the HLP to form a data block. In step 1356, an input data offset may be computed based on the data segmentation offset. In step 1358, the clear text portion within the data block may be ciphered. The location of the clear text portion within the data block may be determined based on the computed input data offset. In step 1360, an output data offset may be computed based on the RLC header and on a MAC header. In step 1362, stuff bits may be inserted into the ciphered data. The number of stuff bits may be determined based on the computed output data offset.

Figure 13B:
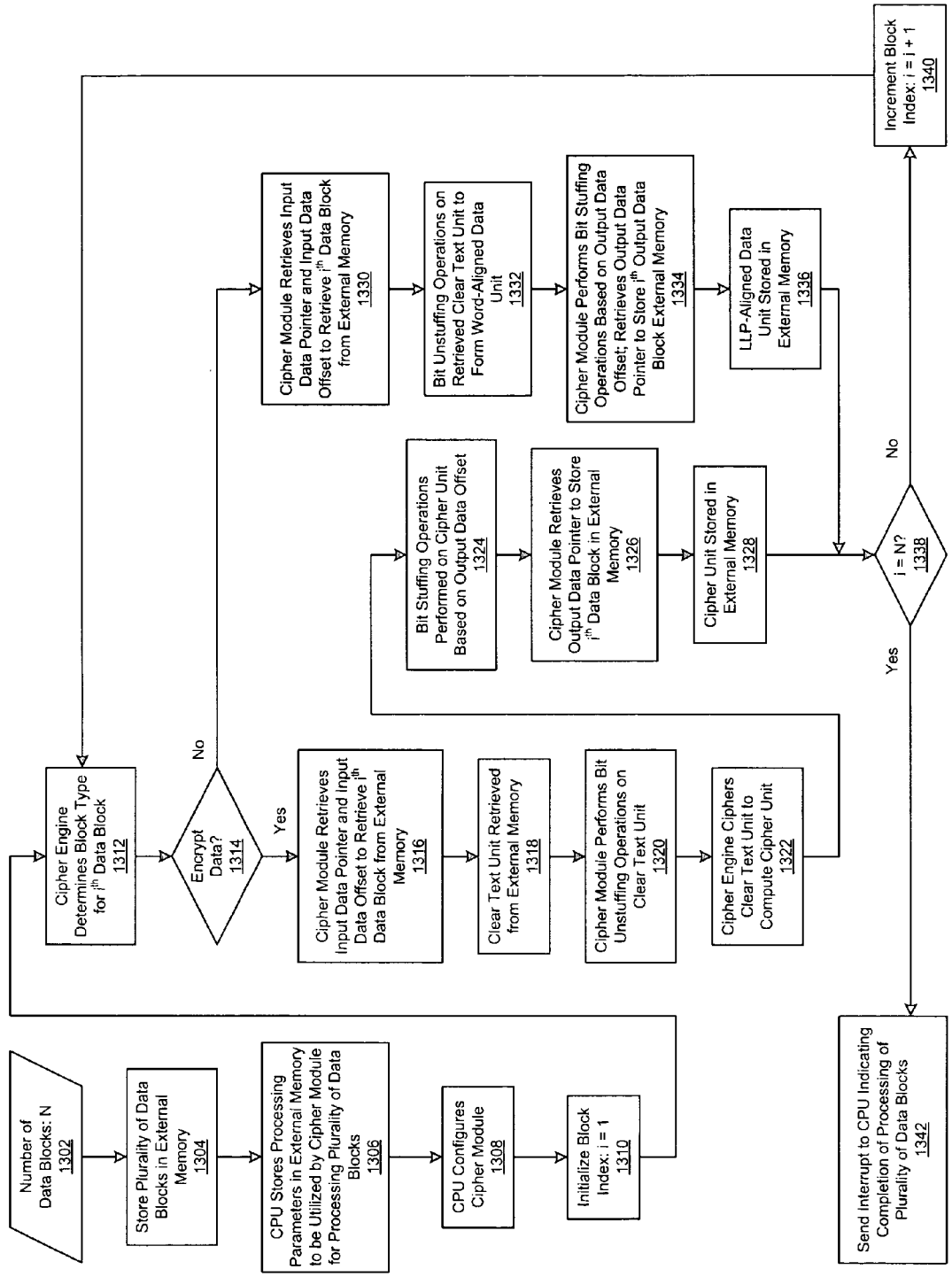
FIG. 13B is a flow chart illustrating exemplary steps for ciphering of unencrypted data and list processing in accordance with an embodiment of the invention.

FIG. 13B is a flow chart illustrating exemplary steps for ciphering of unencrypted data and list processing in accordance with an embodiment of the invention. Referring to FIG. 13B, in step 1302, the number of data blocks, N, to be processed by the cipher module 404 may be determined. In step 1304, a plurality of data blocks may be stored in external memory 416. In step 1306, the CPU 402 may store processing parameters in external memory 416 to be utilized by the cipher module 404 for processing the plurality of data blocks. In step 1308, the CPU 402 may configure the cipher module 404. The processing parameters may be accessed by the cipher module 404 based on the information configured in step 1306.

In step 1310, a block index, i, may be initialized to a value equal to 1. The block index may be utilized to determine an individual data block among the plurality of data blocks stored in external memory 416. In step 1312, the cipher engine 408 may determine the block type for the $i^{th}$ data block. Step 1314 may determine if data contained in the $i^{th}$ data block is to be encrypted.

If step 1314 determines that there is data to be encrypted in the $i^{th}$ data block, in step 1316, the cipher module 404 may retrieve a corresponding input data pointer and input data offset to retrieve the $i^{th}$ data block from external memory 416. In step 1318, a clear text unit may be retrieved from external memory 416. In step 1320, the cipher module 404 may perform bit unstuffing operations on the retrieved clear text unit. In step 1322, the cipher engine 408 may cipher the clear text unit to compute a cipher unit. In step 1324, bit stuffing operations may be performed on the cipher unit based on an output data offset. In step 1326, the cipher module 404 may retrieve a corresponding output data pointer to store the $i^{th}$ data block in external memory 416. In step 1328, the cipher unit may be stored in external memory 416.

Step 1338 may determine if the $i^{th}$ data block is the last data block among the plurality of data blocks stored in external memory 416. If the $i^{th}$ data block is the last data block, in step 1342, the cipher module 404 may send an interrupt to the CPU 402 indicating completion of processing of the plurality of data blocks. If step 1338 determines that the current data block is not the last data block, step 1340 may increment the block index. Step 1312 may follow step 1340.

If step 1314 determines that there is no data to be encrypted in the $i^{th}$ data block, in step 1330, the cipher module 404 may retrieve a corresponding input data pointer and input data offset to retrieve the $i^{th}$ data block from external memory 416. In step 1332, bit unstuffing operations may be performed on the retrieved clear text unit In step 1334, the cipher module 404 may retrieve a corresponding output data pointer and output data offset, perform bit stuffing operations to form a lower layer protocol (LLP) aligned data unit and store the $i^{th}$ output data block to external memory 416. In step 1336, the LLP-aligned data unit may be stored in external memory 416. Step 1338 may follow step 1336.

Various aspects of a system for ciphering interface with list processing may comprise a cipher module 404 that enables deciphering and/or bit stuffing, in hardware, of a potion of one of a plurality of data blocks starting at any bit location that is subsequent to a first bit of the one of the plurality of data blocks. The data block may comprise at least one data word. A modulus of a number representing the bit location with respect to a number of bits in the one of the one or more data words may be a number greater than 0. The cipher module 404 may enable selection of any bit location based on and index and/or an offset. The cipher module 404 may enable selection of deciphering and/or bit stuffing based on configured information. The cipher module 404 may enable performance of deciphering and/or bit stuffing when a portion of the plurality of data blocks contains data that is encrypted.

The cipher module 404 may enable bit stuffing of the deciphered portion of one of the plurality of data blocks. The bit stuffing may result in formation of a word-aligned deciphered data block. The word-aligned, deciphered data block may comprise an integer number of data words. The cipher module 404 may enable performance of bit unstuffing when a portion of the plurality of data blocks contains data that is unencrypted. The bit unstuffed portion of one of the plurality of data blocks may be word-aligned based on an upper layer protocol.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing information, the method comprising:
    performing using one or more processors and/or circuits:
        selecting one of a plurality of data blocks from a list, wherein said list identifies each of said data blocks having a data portion, and wherein a starting bit location of said data portion varies among said data blocks on said list;
        determining whether said data portion of said selected one of said plurality of data blocks comprises encrypted data;
        computing an offset value for said data portion of said selected one of said plurality of data blocks based on said list, wherein said offset indicates an amount offset between a decryption start point and said starting bit location of said data portion; and
        deciphering said data, portion of said selected one of said plurality of data blocks based on said determining, said deciphering starting at said decryption start point of said data portion within said selected one of said plurality of data blocks that is determined based on said offset value.

2. The method according to claim 1, wherein said one of said plurality of data blocks comprises at least one data word.

3. The method according to claim 2, wherein a modulus of a number representing said bit location with respect to a number of bits in one of said at least one data word is a number greater than 0.

4. The method according to claim 1, comprising selecting said any bit location based on at least one of the following: an index and an offset.

5. The method according to claim 1, comprising selecting said one or both of deciphering and bit unstuffing, based on configured information.

6. The method according to claim 1, comprising performing said one or both of deciphering and bit unstuffing, when said portion of said plurality of data blocks contains data that is encrypted.

7. The method according to claim 6, comprising bit stuffing said deciphered portion of one of said plurality of data blocks to form a wordaligned deciphered data block.

8. The method according to claim 7, comprising bit unpacking said word-aligned deciphered data block to form at least one output data word.

9. The method according to claim 1, comprising performing bit unstuffing when said portion of said plurality of data blocks contains data that is unencrypted.

10. The method according to claim 9, wherein said bit unstuffed portion of one of said plurality of data blocks is word-aligned based on an upper layer protocol.

11. A system for processing information, the system comprising:
    one or more circuits that enable selection of one of a plurality of data blocks from a list, wherein said list identifies each of said data blocks having a data portion, and wherein a starting bit location of said data portion varies among said data blocks on the list;
    said one or more circuits enable determination of whether said data portion of said selected one of said plurality of data blocks comprises encrypted data;
    said one or more circuits enable computation of an offset value for said data portion of said selected one of said plurality of data blocks based on said list, wherein said offset indicates an amount offset between a decryption start_point and said starting bit location of said data portion; and
    said one or more circuits enable deciphering of at least a portion of said selected one of said plurality of data blocks based on said determining, said deciphering starting at said decryption start point of said data portion within said selected one of said plurality of data blocks that is determined based on said offset value.

12. The system according to claim 11, wherein said one of said plurality of data blocks comprises at least one data word.

13. The system according to claim 12, wherein a modulus of a number representing said bit location with respect to a number of bits in one of said at least one data word is a number greater than 0.

14. The system according to claim 11, wherein said cipher module is operable to select said any bit location based on at least one of the following:
    an index and an offset.

15. The system according to claim 11, wherein said cipher module is operable to select said one or both of deciphering and bit unstuffing, based on configured information.

16. The system according to claim 11, wherein said cipher module is operable to perform said one or both of deciphering and bit unstuffing, operations when said portion of said plurality of data blocks contains data that is encrypted.

17. The system according to claim 16, wherein said cipher module is operable to perform bit stuffing operations on said deciphered portion of one of said plurality of data blocks to form a word-aligned deciphered data block.

18. The system according to claim 17, wherein said cipher module is operable to perform bit unpacking operations on said word-aligned deciphered data block to form at least one output data word.

19. The system according to claim 11, wherein said cipher module is operable to perform bit unstuffing operations when said portion of said plurality of data blocks contains data that is unencrypted.

20. The system according to claim 19, wherein said bit unstuffed portion of one of said plurality of data blocks is word-aligned based on an upper layer protocol.

* * * * *

UNITED STATES PATENT AND TRADEMARK OFFICE
CERTIFICATE OF CORRECTION

PATENT NO. : 8,306,219 B2
APPLICATION NO. : 11/353687
DATED : November 6, 2012
INVENTOR(S) : Zhou et al.

Page 1 of 1

It is certified that error appears in the above-identified patent and that said Letters Patent is hereby corrected as shown below:

On the Title Page, Item [57], Abstract, please replace "and index" with --an index--.

In the Claims
Claim 1, Column 23, line 31, please replace "data, portion" with --data portion--.
Claim 11, Column 24, line 19, please replace "start_point" with --start point--.

Signed and Sealed this
Fourth Day of March, 2014

Michelle K. Lee
*Deputy Director of the United States Patent and Trademark Office*